(12) United States Patent
Maruyama et al.

(10) Patent No.: US 11,956,364 B2
(45) Date of Patent: Apr. 9, 2024

(54) INFORMATION PROCESSING DEVICE AND INFORMATION PROCESSING METHOD

(71) Applicant: SONY GROUP CORPORATION, Tokyo (JP)

(72) Inventors: Shinya Maruyama, Kanagawa (JP); Yuichi Kageyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 315 days.

(21) Appl. No.: 17/614,442

(22) PCT Filed: May 29, 2020

(86) PCT No.: PCT/JP2020/021495
§ 371 (c)(1),
(2) Date: Nov. 26, 2021

(87) PCT Pub. No.: WO2020/246403
PCT Pub. Date: Dec. 10, 2020

(65) Prior Publication Data
US 2022/0239490 A1    Jul. 28, 2022

(30) Foreign Application Priority Data

Jun. 5, 2019  (JP) .................. 2019-105622
Dec. 4, 2019  (JP) .................. 2019-219900

(51) Int. Cl.
*H04L 9/32*     (2006.01)
(52) U.S. Cl.
CPC .................. *H04L 9/3221* (2013.01)
(58) Field of Classification Search
CPC ... H04L 9/3218; H04L 9/3221; H04L 9/3242; H04L 9/50; H04L 63/08
See application file for complete search history.

(56) References Cited

U.S. PATENT DOCUMENTS 9,774,578 B1    9/2017  Ateniese
2012/0167189 A1 6/2012  Aichroth
(Continued)

FOREIGN PATENT DOCUMENTS

JP    H07-336348 A    12/1995
JP    2004-229071 A    8/2004
(Continued)

OTHER PUBLICATIONS

Ari Juels et al: "A fuzzy commitment scheme", 6th. ACM Conference on Computer and Communications Security. Singapore, Nov. 2-4, 1999; [ACM Conference on Computer and Communications Security], New York, NY: ACM, US, Nov. 1, 1999 (Nov. 1, 1999), pp. 28-36, XP058375009, DOI: 10.1145/319709.319714 ISBN: 978-1-58113-148-2.

*Primary Examiner* — Minh Dinh
(74) *Attorney, Agent, or Firm* — Paratus Law Group, PLLC

(57) ABSTRACT

A settlement processing device, which is an example of an information processing device, includes an acquisition unit, a verification unit, and a providing unit. The acquisition unit acquires, from a user terminal used by a user who is a request source for a service, proof information that is for proving, by zero knowledge proof, that a user is an identity verified user, and that is generated by using secret information that only the identity verified user is allowed to know. A verification unit executes a verification process of proof information acquired by an acquisition unit by using encrypted information of identity verification information used in an identity verification process of the identity verified user managed in a block chain system, where the encrypted information is encrypted using secret information. The providing unit executes a process for providing a service to a user who is a request source for a service on (Continued)

condition that the user is proved to be an identity verified user as a result of the verification process by the verification unit.

11 Claims, 13 Drawing Sheets

(56) References Cited

U.S. PATENT DOCUMENTS

| | | | |
|---|---|---|---|
| 2018/0270065 A1 | 9/2018 | Brown et al. | |
| 2019/0165943 A1 | 5/2019 | Chari | |
| 2020/0076602 A1* | 3/2020 | Redpath | H04L 9/0643 |
| 2021/0258164 A1* | 8/2021 | Brown | H04L 9/3066 |

FOREIGN PATENT DOCUMENTS

| | | | |
|---|---|---|---|
| JP | 6438615 B1 | 12/2018 | |
| JP | 6494004 B1 | 4/2019 | |
| JP | 6504639 B1 | 4/2019 | |

* cited by examiner

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2020/021495 (filed on May 29, 2020) under 35 U.S.C. § 371, which claims priority to Japanese Patent Application Nos. 2019-105622 (filed on Jun. 5, 2019) and 2019-219900 (filed on Dec. 4, 2019), which are all hereby incorporated by reference in their entirety.

FIELD

The present disclosure relates to an information processing device and an information processing method.

BACKGROUND

In recent years, there are a wide variety of services for which identity verification is required. At the start of use of the service, the user is required to perform an identity verification process for each individual service.

CITATION LIST

Patent Literature

Patent Literature 1: JP 6504639 B1
Patent Literature 2: JP 2004-229071 A

SUMMARY

Technical Problem

In the identity verification process, the procedure may be complicated, and user convenience may be poor. In addition, there is a case where it is necessary to provide personal information in the identity verification process, and protection of user privacy is required.

Therefore, the present disclosure proposes an information processing device and an information processing method capable of simplifying an identity verification procedure when using a service requiring identity verification while protecting privacy of a service user.

Solution to Problem

To solve the above problem, an information processing device that provides a service that requires an identity verification process according to an embodiment of the present disclosure includes: an acquisition unit that acquires, from a user terminal used by a user who is a request source for a service, proof information for proving, by zero knowledge proof, that the user is an identity verified user who has completed the identity verification process, the proof information being generated by using secret information that only the identity verified user is allowed to know; a verification unit that executes a verification process of the proof information acquired by the acquisition unit using encrypted information of identity verification information used in an identity verification process of the identity verified user managed in a block chain system, the encrypted information being encrypted using the secret information; and a providing unit that executes a process for providing a service to the user who is a request source for the service on condition that the user is proved to be the identity verified user as a result of a verification process by the verification unit.

DESCRIPTION OF EMBODIMENTS

Figure 1:
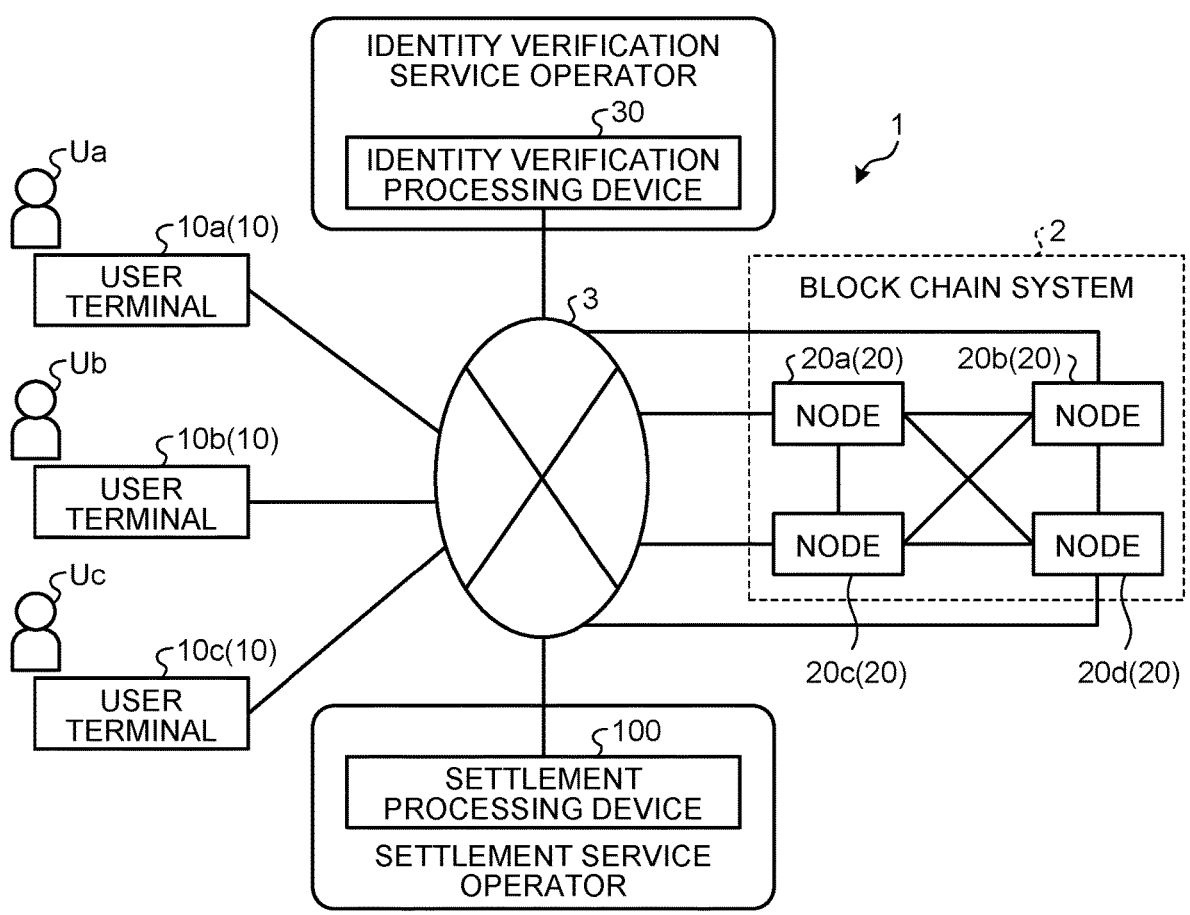
FIG. 1 is a diagram illustrating an example of an information processing system according to the embodiment.

Hereinafter, the embodiments of the present disclosure will be described in detail with reference to the drawings. In the following embodiments, the same reference numerals are given to the same parts or constituent elements having substantially the same function, and redundant description may be omitted. For example, in a case where it is not necessary to particularly distinguish the user terminals 10a, 10b, and 10c, they are simply described as the user terminal 10.

Further, the present disclosure will be described in the following item order.

1. Introduction
2. Functional configuration example
3. Processing procedure example
4. Modification
5. Others
6. Effects
7. Hardware configuration <<1. Introduction>>

In financial institutions, the obligation to verify the identity of a customer who conducts specific transactions is stipulated by law. For this reason, in a bank or the like, having an account for which identity verification has been completed is prerequisite to a transaction between accounts. On the other hand, in a distributed ledger system that manages a transaction history or the like of cryptocurrency using a block chain, anonymous transactions are possible, but identity verification specified by law is required when cashing into legal currency. For this reason, in many cryptocurrency exchanges, identity verification for cashing cryptocurrency into legal currency is required.

In addition, there are a wide variety of services requiring identity verification, such as credit card issuance, secondhand product trade, and online payment and remittance services. In order to use such a service, complicated identity verification process is required in each service.

For example, as a procedure for identity verification, it may be required to upload a copy of an identification card to a system of a service operator, fill in a document sent from the service operator, and return the document to the service operator by mail. Alternatively, as a procedure for identity verification, it may be required by a service operator to upload a copy of an identification card and account information of a bank account together. In addition, as a procedure for identity verification, it may be required to upload an image of an identification card and upload moving image data in which both the user and the identification card are imaged. As described above, the procedure of identity verification is troublesome for the user.

In addition, in the identity verification, personal information such as an identification card and account information is often provided, which causes considerable anxiety to the user from the viewpoint of privacy protection.

Therefore, the present embodiment proposes an information processing device and an information processing method capable of simplifying identity verification when using a service that requires identity verification while protecting user privacy.

<<2. Functional Configuration Example>>

FIG. 1 is a diagram illustrating an example of an information processing system according to the embodiment. As illustrated in FIG. 1, an information processing system 1 includes a block chain system 2, user terminals 10a, 10b, and 10c, an identity verification processing device 30, and a settlement processing device 100. The configuration of the information processing system 1 according to the embodiment is not particularly limited to the example illustrated in FIG. 1, and may include, for example, the plurality of identity verification processing devices 30 and the plurality of settlement processing devices 100.

The block chain system 2, the user terminal 10, the identity verification processing device 30, and the settlement processing device 100 are connected to a predetermined communication network 3. The communication network 3 includes a local area network (LAN), a wide area network (WAN), a telephone network (mobile telephone networks, fixed telephone networks, and the like), a regional Internet protocol (IP) network, the Internet, and the like. The block chain system 2, the user terminal 10, the identity verification processing device 30, and the settlement processing device 100 can communicate with each other in a wired or wireless manner via the communication network 3.

The block chain system 2 executes a process related to a block chain. For example, in the block chain system 2, the identity verification processing device 30 manages each block in which data related to the identity verification process of the user of the user terminal 10 is compiled as a block chain configured by connecting the blocks in the processing order.

The user terminal 10 is a user device used by a user who is a user of various services requiring identity verification. For example, the user terminal 10a is used by a user Ua, the user terminal 10b is used by a user Ub, and the user terminal 10c is used by a user Uc. The user terminal 10 is realized by, for example, an information processing device such as a cellular phone including a smartphone, a tablet terminal, a desktop PC, a notebook PC, or a personal digital assistant (PDA).

The identity verification processing device 30 is an information processing device operated by an identity verification service operator that provides a service for performing the identity verification process online, a so-called electric know your customer (eKYC) service. The identity verification processing device 30 is realized by a desktop PC, a notebook PC, a server, or the like.

The settlement processing device 100 is an information processing device operated by an operator providing an online settlement service. The settlement processing device 100 functions as an example of an information processing device that provides a service requiring the identity verification process at the time of use. The settlement processing device 100 is realized by a desktop PC, a notebook PC, a server, or the like.

The service requiring the identity verification process at the time of use is not particularly limited to the settlement service. Examples of the service can include, in addition to various financial services such as issuance of a credit card and opening of an account, insurance services, finance services such as asset management and asset management, social lending services, and the like.

<2-1. Block Chain System>

The block chain system 2 appropriately uses various conventional techniques related to block chains such as "Hyperledger Fabric" to generate and manage a block chain in which data blocks organized in predetermined units are linked. The block chain system 2 may have any configuration as long as the processing according to the embodiment of the present disclosure can be realized.

The form of the block chain of the block chain system 2 may be various forms such as a public type (public chain) and a private type (private chain).

Various conventional techniques may be appropriately used as necessary for the consensus building algorithm (consensus algorithm) in the block chain system 2. Examples of the consensus building algorithm include Practical Byzantine Fault Tolerance (PBFT), Proof of Consensus (PoC), Proof of Stake (PoS), and Proof of Importance (PoI). When Practical Byzantine Fault Tolerance (PBFT) is used, a core node functioning as a specific administrator for consensus building is required.

The block chain system 2 executes a process related to a block chain. For example, in the block chain system 2, the identity verification processing device 30 manages each block in which data related to the identity verification process of the user of the user terminal 10 is compiled as a block chain configured by connecting the blocks in the processing order.

In the example illustrated in FIG. 1, the block chain system 2 includes a plurality of nodes 20 (20a, 20b, 20c, 20d). The number of nodes constituting the block chain system 2 is not particularly limited to the number in the example illustrated in FIG. 1, and may include less than four nodes or five or more nodes.

Each node 20 constituting the block chain system 2 is an information processing device that executes various processes such as block generation and block chain sharing. The node 20 includes, for example, a communication unit realized by a network interface card (NIC), a communication circuit, or the like, and is connected to the communication network 3 (the Internet or the like) in a wired or wireless manner. Each node 20 transmits and receives information to and from other devices such as the identity verification processing device 30 and the settlement processing device 100 via the communication network 3. Each node 20 communicates information on a block chain with other nodes 20.

Each node 20 includes, for example, a control unit implemented by a microcomputer or the like. The microcomputer includes a processor such as a central processing unit (CPU) or a micro processing unit (MPU), and a storage device such as a read only memory (ROM) or a random access memory (RAM). The ROM stores a program that controls each unit of the node 20. A processor such as a CPU executes a program stored in the ROM, whereby control of the node 20 by the microcomputer is realized. The RAM is used as a memory region necessary for execution of calculation by a processor such as a CPU. For example, each node 20 includes a storage unit realized by a semiconductor memory device such as a random access memory (RAM) and a flash memory, or a storage device such as a hard disk and an optical disk. Each node 20 stores the block chain in the storage unit. The control unit may be realized by an integrated circuit such as an application specific integrated circuit (ASIC) or a field programmable gate array (FPGA).

Each node 20 executes a process for sharing by the block chain of each block regarding the identity verification process executed by the identity verification processing device 30. Each block related to the identity verification process includes user identification information uniquely assigned to each user (identity verified user) of the user terminal 10 for which the identity verification process has been completed, encrypted information obtained by encrypting the identity verification information used for the identity verification process, and the like.

Furthermore, each node 20 executes a process of extracting corresponding information and transmitting the information to a request source in response to a request from an external device such as the user terminal 10 or the settlement processing device 100. For example, when receiving an acquisition request from an external device such as the user terminal 10 or the settlement processing device 100 about the encrypted information, each node 20 transmits the encrypted information corresponding to the user identification information included in the acquisition request to the request source. In other words, each node 20 searches for (extracts) the information corresponding to the request from the request source from the block chain stored in the storage unit by appropriately using various technologies related to block chain search such as block (block chain) explorer to transmit the searched (extracted) information to the request source. The block chain system 2 may include a service providing device that performs various processes such as acquiring corresponding information from the node 20 in response to a request from an external apparatus and transmitting the information to a request source.

In the information processing system 1 according to the first embodiment, the block chain system 2 manages data related to the identity verification process of the user of the user terminal 10, so that falsification of the data related to the identity verification is prevented and data restoration is facilitated.

<2-2. User Terminal>

Figure 2:
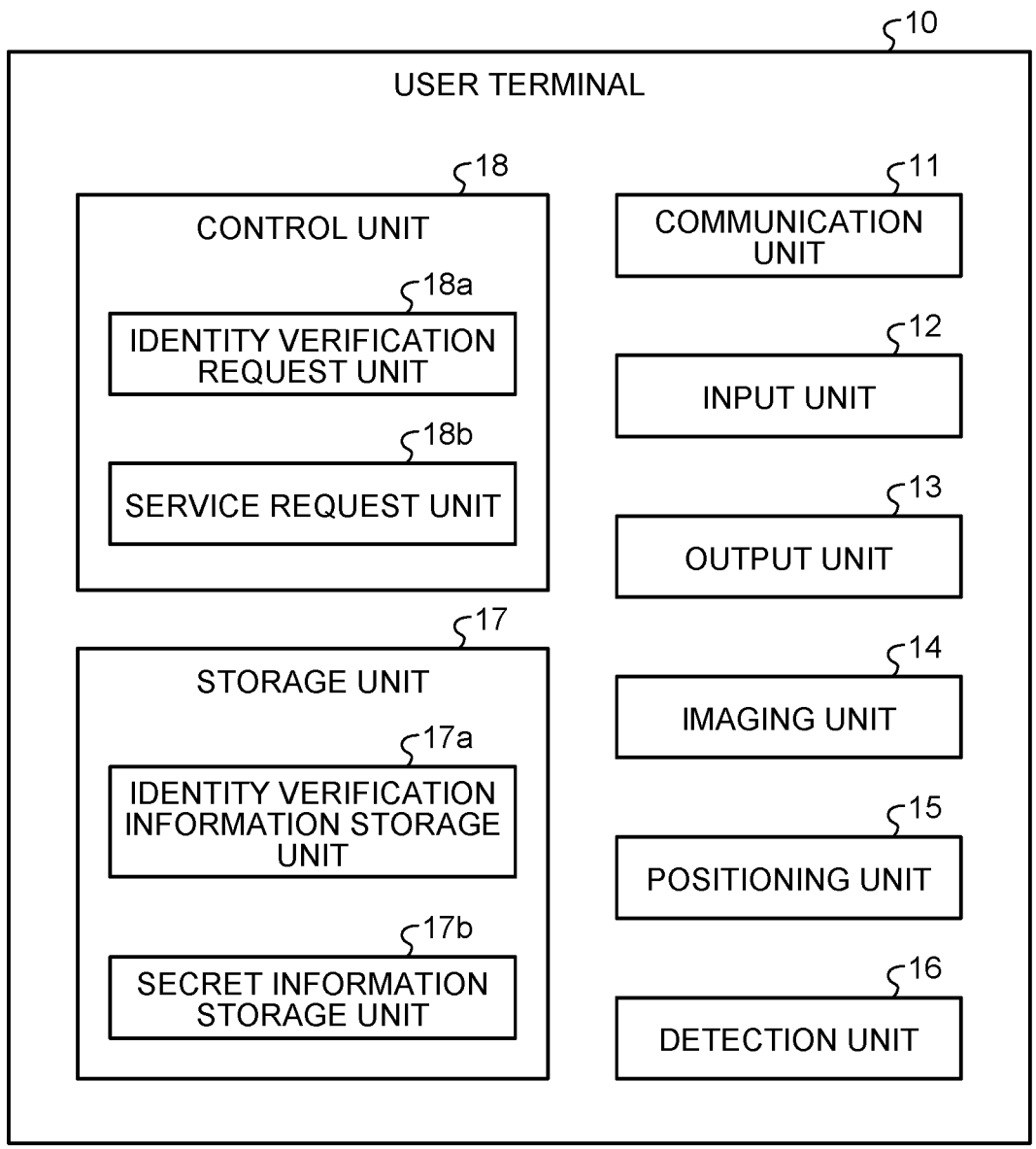
FIG. 2 is a diagram illustrating an example of a functional configuration of a user terminal according to the embodiment.

FIG. 2 is a diagram illustrating an example of a functional configuration of a user terminal according to the embodiment. As illustrated in FIG. 2, the user terminal 10 includes a communication unit 11, an input unit 12, an output unit 13, an imaging unit 14, a positioning unit 15, a detection unit 16, a storage unit 17, and a control unit 18.

The communication unit 11 is realized by, for example, a network interface card (NIC), a communication module, or the like. The communication unit 11 is connected to the communication network 3 in a wired or wireless manner to transmit and receive information to and from the block chain system 2, the identity verification processing device 30, the settlement processing device 100, and the like via the communication network 3. The information transmitted and received by the communication unit 11 includes, in addition to the encrypted information, the random number, and the user identification information received from the identity verification processing device 30, proof information ([Proof]: proof) to be transmitted to the settlement processing device 100, and the like. The encrypted information is information obtained by encrypting the identity verification information used for the identity verification process. The random number is information received by the communication unit 11 only when the identity verification processing device 30 completes the identity verification process. The proof information ([Proof]: proof) is information for proving, by the zero knowledge proof, that the user is an identity verified user who has completed the identity verification process. Identity verification information used for the identity verification process, proof information ([Proof]: proof) for proving, by the zero knowledge proof, that the user is an identity verified user who has completed the identity verification process, and the like are included.

The input unit 12 includes a keyboard, a mouse, and the like, and receives various operations from the user of the user terminal 10. The operation received by the input unit 12 from the user terminal 10 includes an operation for requesting identity verification from the identity verification processing device 30, an operation for requesting of the settlement processing device 100 for use of the settlement service, and the like. The input unit 12 may include a sound input device such as a microphone, and receives an input of a user's voice or the like.

The output unit 13 includes a display, a speaker, and the like to output various types of information. The information output from the output unit 13 includes a user interface for the identity verification process provided from the identity verification processing device 30, a user interface for use of a settlement service provided from the settlement processing device 100, and the like.

The imaging unit 14 includes a device such as a camera and captures an image. The imaging unit 14 can acquire an image of an identification card of the user, a moving image including the user and the identification card, and the like as the identity verification information that can be handled in the identity verification process.

The positioning unit 15 includes a global positioning system (GPS) or the like to acquire a position of user terminal 10. The positioning unit 15 can acquire position information or the like of the user's home or his or her parent's home as identity verification information that can be handled in the identity verification process.

The detection unit 16 includes an acceleration sensor, a gyro sensor, a biological sensor, and the like, and detects various types of information acting on the user terminal 10. The detection unit 16 can acquire biometric information such as a feature amount corresponding to the gait of the user, a waveform of a heartbeat, and a feature point of a fingerprint as identity verification information that can be handled in the identity verification process.

The storage unit 17 stores programs, data, and the like for realizing various processing functions executed by the control unit 18. For example, the storage unit 17 is realized by a semiconductor memory device such as a random access memory (RAM) and a flash memory, or a storage device such as a hard disk and an optical disk. The program stored in the storage unit 17 includes a program for realizing a process corresponding to each unit of the control unit 18. One of the functions provided by this program includes a function for causing the user terminal 10 to execute a process for identity verification by the zero knowledge proof described below.

As illustrated in FIG. 2, the storage unit 17 includes an identity verification information storage unit 17a and a secret information storage unit 17b.

The identity verification information storage unit 17a stores identity verification information used for the identity verification process. The identity verification information stored in the identity verification information storage unit 17a includes image information of an identification card such as a driver's license, an insurance card, and a My Number card (My Number notification card), and various types of personal information such as a credit card number, account information of a financial institution, an address, a name, an age, a date of birth, and a telephone number. In addition, the identity verification information storage unit 17a may store, as the identity verification information, various kinds of biometric information acquired by the detection unit 16, position information acquired by the positioning unit 15, and the like. Various types of personal information stored in the identity verification information storage unit 17a functions as secret information that only the identity verified user who has completed the identity verification process is allowed to know.

The secret information storage unit 17b stores a random number transmitted from the identity verification processing device 30 to the user terminal 10 on condition that the identity verification process is completed. The random number stored in the secret information storage unit 17b is generated by the identity verification processing device 30. The random number generated by the identity verification processing device 30 is a secret value associated with the user of the user terminal 10 who is a request source for the identity verification process. This random number is used to generate proof information ([Proof]: proof) for proving, by zero knowledge proof, that the user is an identity verified user who has completed the identity verification process.

The control unit 18 executes various processes in the user terminal 10. The control unit 18 is realized by a microcomputer or the like. The microcomputer is, for example, realized by a processor such as a central processing unit (CPU) or a micro processing unit (MPU). A processor such as a central processing unit (CPU) or a micro processing unit (MPU), and a storage device such as a read only memory (ROM) or a random access memory (RAM) are mounted. The ROM stores a program that controls each unit of the user terminal 10. A processor such as a CPU executes a program stored in the ROM, whereby control of the user terminal 10 by the microcomputer is realized. The RAM is used as a memory region necessary for execution of calculation by a processor such as a CPU. The program that controls each unit of the user terminal 10 may be stored in the storage unit 17, and the control of the user terminal 10 by the microcomputer is realized by the processor executing the program stored in the storage unit 17. The control unit 18 may be realized by an integrated circuit such as an application specific integrated circuit (ASIC) or a field programmable gate array (FPGA).

As illustrated in FIG. 2, the control unit 18 includes an identity verification request unit 18a and a service request unit 18b.

The identity verification request unit 18a requests the identity verification processing device 30 to perform the identity verification process. When transmitting the identity verification request to the identity verification processing device 30, the identity verification request unit 18a can enclose identity verification information used for the identity verification request. Alternatively, after transmitting the identity verification request for requesting the identity verification process to the identity verification processing device 30, the identity verification request unit 18a may transmit identity verification information responding to the request returned from the identity verification processing device 30 again. Image information of an identification card such as a driver's license, an insurance card, or a My Number card (My Number notification card) can be employed as the identity verification information.

When the identity verification process is completed in the identity verification processing device 30, the identity verification request unit 18a receives the random number transmitted from the identity verification processing device 30 on condition that the identity verification process is completed together with the user identification information uniquely assigned to each identity verified user. The identity verification request unit 18a stores the user identification information and the random number received from the identity verification processing device 30 in the storage unit 17 in association with each other.

The service request unit 18b requests provision of various services by transmitting a service request to the settlement processing device 100. When transmitting the service request to the settlement processing device 100, the service request unit 18b uses proof information ([Proof]: proof) for proving, by the zero knowledge proof, that the user is an identity verified user who has completed the identity verification process. The service request unit 18b requests the settlement processing device 100 to provide a service by transmitting, to the settlement processing device 100, a service request including user identification information allocated from the identity verification processing device 30 and proof information.

The service request unit 18b executes the "ZKP (zero knowledge proof)-Prove" process of generating proof information ([Proof]: proof) for proving, by zero knowledge proof, that the user is an identity verified user when requesting the settlement processing device 100 to provide a service. The "ZKP-Prove" process includes a "WitnessRedution" process.

The "WitnessRedution" process is executed based on identity verification information (personal information) that is information that only the identity verified user is allowed to know and a random number, and encrypted information, as public information, managed in the block chain system 2. The identity verification information is acquired from the identity verification information storage unit 17a. The random number is acquired from the secret information storage unit 17b. The encrypted information is acquired from the block chain system 2 based on the user identification information associated with the random number acquired from the secret information storage unit 17b. The encrypted information managed by the block chain system 2 is information generated by the identity verification processing device 30 encrypting the identity verification information using a random number in the identity verification process.

In the "WitnessRedution" process, for example, a polynomial that cannot be generated in polynomial time can be generated when a random number that is secret information (Witness) that only the user is allowed to know and identity verification information are not present. That is, in the "WitnessRedution" process, when the random number and the encrypted information do not match, the correct "polynomial h" is not generated.

The service request unit 18b can generate, for example, a "polynomial h" generated by the "WitnessRedution" process as proof information for proving, by zero knowledge proof, that the user is an identity verified user who has completed the identity verification process. The algorithm that generates the proof information for proving, by the zero knowledge proof, that the user is an identity verified user who has completed the identity verification process is not particularly limited to the algorithm that generates the "polynomial h". Various algorithms that generate proof information for proving, by the zero knowledge proof, that the user is an identity verified user who has completed the identity verification process can be used.

<2-3. Identity Verification Processing Device>

Figure 3:
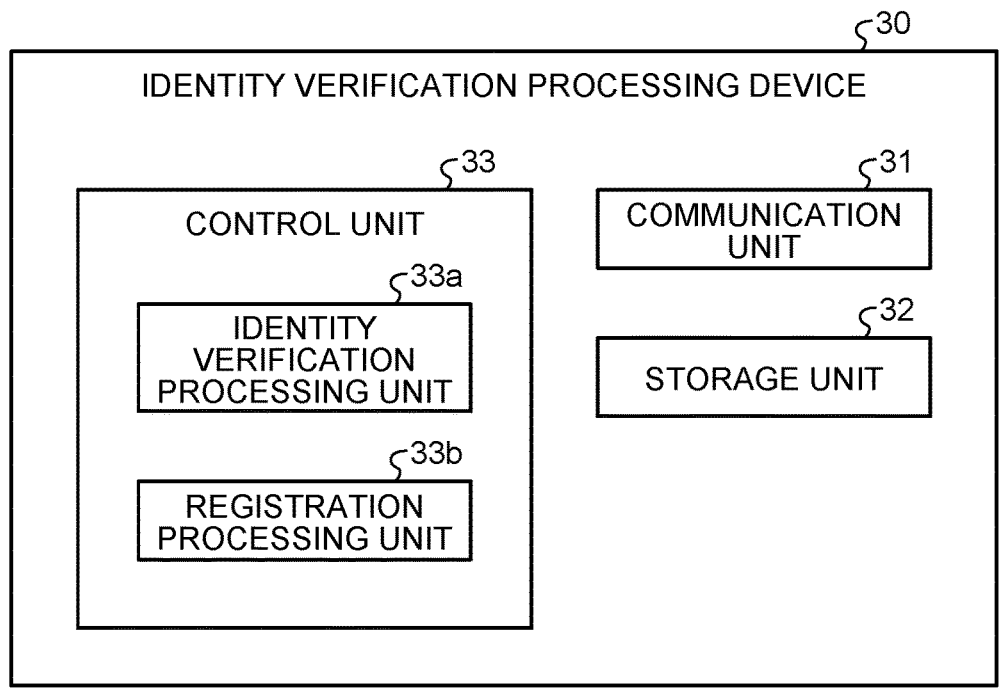
FIG. 3 is a diagram illustrating an example of a functional configuration of an identity verification processing device according to the embodiment.

FIG. 3 is a diagram illustrating an example of a functional configuration of the identity verification processing device according to the embodiment. As illustrated in FIG. 3, the identity verification processing device 30 includes a communication unit 31, a storage unit 32, and a control unit 33.

The communication unit 31 is realized by, for example, a network interface card (NIC) or the like. The communication unit 31 is connected to the communication network 3 in a wired or wireless manner to transmit and receive information to and from the block chain system 2, the user terminal 10, and the like via the communication network 3. The information transmitted and received by the communication unit 31 includes identity verification information received from the user terminal 10, user identification information and random numbers transmitted to the user terminal 10, encrypted information transmitted to the block chain system 2, and the like. The identity verification information is information used for the identity verification process of the user of the user terminal 10. The user identification information is information uniquely assigned to the identity verified user who has completed the identity verification process. The random number is secret information transmitted to the user terminal 10 on condition that the identity verification process is completed. The encrypted information is information obtained by encrypting the identity verification information using a random number.

The storage unit 32 stores programs, data, and the like for realizing various processing functions executed by the control unit 33. For example, the storage unit 32 is realized by a semiconductor memory device such as a random access memory (RAM) and a flash memory, or a storage device such as a hard disk and an optical disk. The program stored in the storage unit 32 includes a program for realizing a process corresponding to each unit of the control unit 33. One of the functions provided by this program includes a function for causing the identity verification processing device 30 to execute the identity verification process described below.

The control unit 33 executes various processes in the identity verification processing device 30. The control unit 33 is realized by a microcomputer or the like. The microcomputer is, for example, realized by a processor such as a central processing unit (CPU) or a micro processing unit (MPU). A processor such as a central processing unit (CPU) or a micro processing unit (MPU), and a storage device such as a read only memory (ROM) or a random access memory (RAM) are mounted. The ROM stores a program that controls each unit of the identity verification processing device 30. When a processor such as a CPU executes a program stored in the ROM, control of the identity verification processing device 30 by a microcomputer is realized. The RAM is used as a memory region necessary for execution of calculation by a processor such as a CPU. The program that controls each unit of the identity verification processing device 30 may be stored in the storage unit 32, and the processor executes the program stored in the storage unit 32, whereby the control of the identity verification processing device 30 by the microcomputer is realized. The control unit 33 may be realized by an integrated circuit such as an application specific integrated circuit (ASIC) or a field programmable gate array (FPGA).

As illustrated in FIG. 3, the control unit 33 includes an identity verification processing unit 33a and a registration processing unit 33b.

The identity verification processing unit 33a executes the identity verification process online in response to the identity verification request received from the user terminal 10.

Specifically, upon receiving the identity verification request from the user terminal 10, the identity verification processing unit 33a establishes a communication session for the identity verification process, for example, to transmit a request for uploading identity verification information used for identity verification to the user terminal 10 through the established communication session.

Subsequently, the identity verification processing unit 33a executes the identity verification process using the identity verification information uploaded by the user terminal 10. Furthermore, the identity verification processing unit 33a generates a random number associated with the user of the user terminal 10 who is a request source for the identity verification process. Such a random number is a secret value associated with the user of the user terminal 10 who is a request source for the identity verification process. Such a random number is only required to be information associated with the user of the user terminal 10 who is a request source for the identity verification process, and various types of information can be used.

Subsequently, the identity verification processing unit 33a generates encrypted information obtained by encrypting the identity verification information uploaded by the user terminal 10 using the generated random number. For example, the identity verification processing unit 33a calculates a hash value using the identity verification information and a random number as inputs, and uses the calculated hash value as encrypted information.

The registration processing unit 33b executes a registration process for the block chain system 2. When the encrypted information is generated in the identity verification processing unit 33a, the registration processing unit 33b generates unique user identification information to be assigned to the user of the user terminal 10 who is a request source for the identity verification process. Then, the registration processing unit 33b registers the user identification information and the encrypted information in the block chain system 2 in association with each other. As a result, the user identification information and the encrypted information are set up in the block chain system 2 as public information for proving, by the zero knowledge proof, that the identity verification process is completed.

Furthermore, the registration processing unit 33b returns user identification information and a random number associated with the user of the user terminal 10 who is a request source for the identity verification process to the user terminal 10 who is a request source for the identity verification process. As a result, a random number to be used for generating proof information for proving, by the zero knowledge proof, that the user is an identity verified user who has completed the identity verification process is set up in the user terminal 10.

<2-4. Settlement Processing Device>

Figure 4:
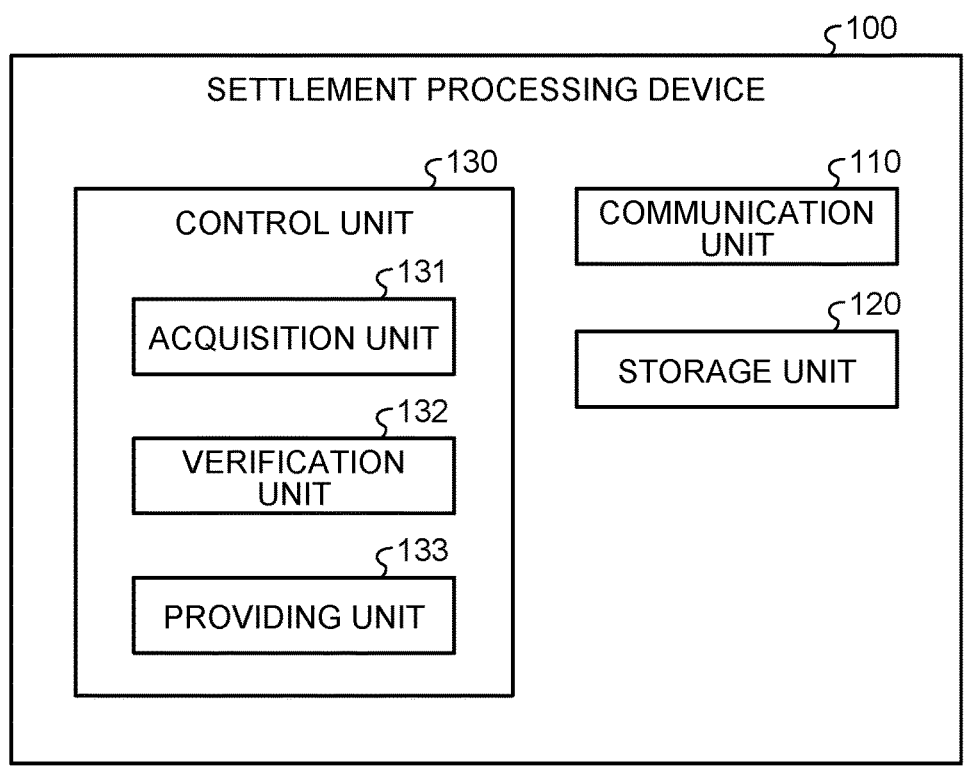
FIG. 4 is a diagram illustrating an example of a functional configuration of a settlement processing device according to an embodiment.

FIG. 4 is a diagram illustrating an example of a functional configuration of a settlement processing device according to the embodiment. As illustrated in FIG. 4, the settlement processing device 100 includes a communication unit 110, a storage unit 120, and a control unit 130.

The communication unit 110 is realized by, for example, a network interface card (NIC) or the like. The communication unit 110 is connected to the communication network 3 in a wired or wireless manner to transmit and receive information to and from the block chain system 2, the user terminal 10, and the like via the communication network 3. The information transmitted to and received by the communication unit 110 includes proof information ([Proof]: proof) received from the user terminal 10, encrypted information acquired from the block chain system 2, and the like. The proof information ([Proof]: proof) is information for proving, by the zero knowledge proof, that the user is an identity verified user who has completed the identity verification process. The encrypted information is information obtained by encrypting the identity verification information used by the user of the user terminal 10 in the identity verification process. The storage unit 120 stores programs, data, and the like for realizing various processing functions executed by the control unit 130. For example, the storage unit 120 is realized by a semiconductor memory device such as a random access memory (RAM) and a flash memory, or a storage device such as a hard disk and an optical disk. The program stored in the storage unit 120 includes a program for realizing a process corresponding to each unit of the control unit 130. One of the functions provided by this program includes a function for causing the settlement processing device 100 to execute verification processing described below.

The control unit 130 executes various processes in the settlement processing device 100. The control unit 130 is realized by a microcomputer or the like. The microcomputer is, for example, realized by a processor such as a central processing unit (CPU) or a micro processing unit (MPU). A processor such as a central processing unit (CPU) or a micro processing unit (MPU), and a storage device such as a read only memory (ROM) or a random access memory (RAM) are mounted. The ROM stores a program that controls each unit of the settlement processing device 100. A processor such as a CPU executes a program stored in the ROM, so that control of the settlement processing device 100 by the microcomputer is realized. The RAM is used as a memory region necessary for execution of calculation by a processor such as a CPU. The program that controls each unit of the settlement processing device 200 may be stored in the storage unit 120, and the control of the settlement processing device 100 by the microcomputer is realized by the processor executing the program stored in the storage unit 120. The control unit 130 may be realized by an integrated circuit such as an application specific integrated circuit (ASIC) or a field programmable gate array (FPGA).

As illustrated in FIG. 4, the control unit 130 includes an acquisition unit 131, a verification unit 132, and a providing unit 133.

The acquisition unit 131 acquires, from the user as the service request source, the proof information generated by using the secret information that only the identity verified user is allowed to know. Here, the proof information is proof information for proving, by the zero knowledge proof, that the user is an identity verified user who has completed the identity verification process, and is enclosed in a service request transmitted from the user terminal 10. In addition, the acquisition unit 131 acquires user identification information enclosed in the service request together with the proof information. The secret information that only the identity verified user is allowed to know corresponds to, for example, identity verification information used for the identity verification process and a random number that is information associated with the user of the user terminal 10 who is a request source for the identity verification process.

The verification unit 132 executes the verification process ("ZKP-Verify" process) of the proof information acquired by the acquisition unit 131 by using the encrypted information encrypted by using the secret information and managed in the block chain system 2. The encrypted information managed in the block chain system 2 is information obtained by encrypting the identity verification information used in the identity verification process of the identity verified user. The encrypted information is generated by the identity verification processing device 30 encrypting the identity verification information using a random number generated by the identity verification processing device 30 itself, and is registered in the block chain system 2 by the identity verification processing device 30.

The "ZKP-Verify" process is performed by acquiring, from the block chain system 2, encrypted information associated with the user identification information acquired by the acquisition unit 131. By the "ZKP-Verify" process, whether the proof information acquired from the user terminal 10 is created based on the random number which is secret information that only the identity verified user is allowed to know is verified. Specifically, for example, in a case where a "polynomial h" is generated as the proof information in the user terminal 10, in the "ZKP-Verify" process, for example, matching between a calculation result based on the encrypted information acquired from the block chain system 2 and the proof information is performed. Then, in the "ZKP-Verify" process, whether the proof information is generated from a correct "polynomial h" is verified. That is, by the "ZKP-Verify" process, whether the service request is from the identity verified user who has completed the identity verification process is proved.

In the "ZKP-Verify" process, in a case where it can be proved as a result of the verification that the proof information is generated from the correct "polynomial h", a verification result indicating that the user of the user terminal 10 who is a request source for the service is the authentic identity verified user is derived. The correct "polynomial h" means a polynomial generated by the random number same as the random number used when generating the encrypted information. On the other hand, in the "ZKP-Verify" process, in a case where it cannot be proved as a result of the verification that the proof information is generated from the correct "polynomial h", a verification result indicating that the user of the user terminal 10 who is the transmission source of the proof information is not the authentic identity verified user is derived.

The providing unit 133 executes a process for providing a service to the user who uses the user terminal 10 as the service request source on condition that it is proved that the user as the service request source has completed the identity verification process as a result of the verification process by the verification unit 132. The providing unit 133 may notify the service request source that the verification processing has been correctly completed.

<<3. Processing Procedure Example>>

<3-1. Procedure of Process Related to Identity Verification and Registration of Encrypted Information>

Figure 5:
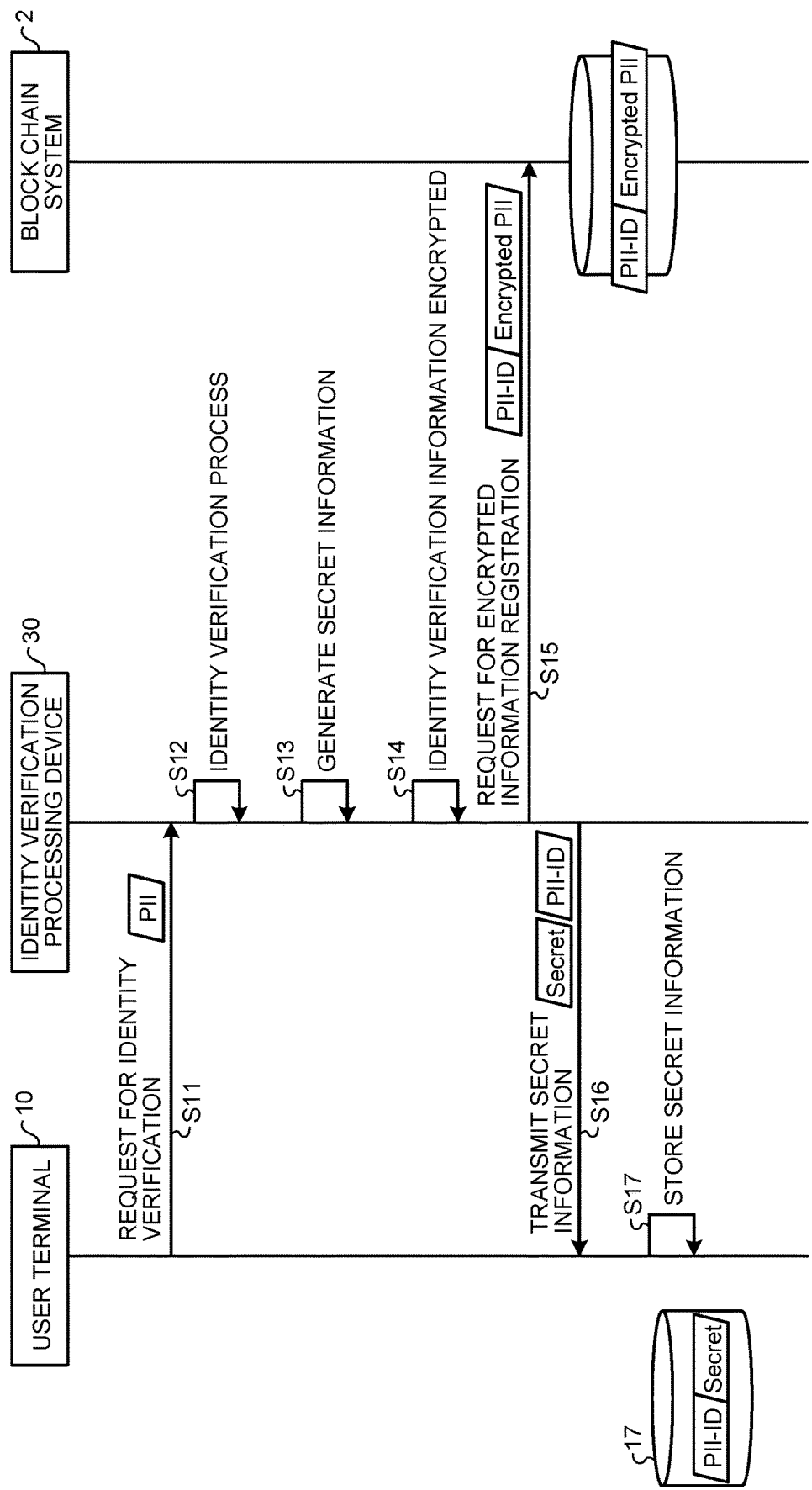
FIG. 5 is a diagram illustrating an example of a procedure of an identity verification process and a process related to registration of encrypted information according to the embodiment.

With reference to FIG. 5, a procedure of an identity verification process and a process related to registration of encrypted information according to the embodiment will be described. FIG. 5 is a diagram illustrating an example of a procedure of an identity verification process and a process related to registration of encrypted information according to the embodiment.

As illustrated in FIG. 5, the user terminal 10 transmits an identity verification request for requesting implementation of the identity verification process to the identity verification processing device 30 (Step S11). For example, when transmitting the identity verification request, the user terminal 10 can enclose identity verification information used for the identity verification process.

The identity verification processing device 30 that has received the identity verification request executes the identity verification process (Step S12). In addition, the identity verification processing device 30 generates secret information (random number) associated with the user of the user terminal 10 who is a request source for the identity verification process (Step S13).

Subsequently, the identity verification processing device 30 generates encrypted information ([Encrypted PII]) obtained by encrypting the identity verification information used in the identity verification process in Step S12 by using the random number ([Secret]) that is the secret information generated in Step S13 (Step S14).

After generating the encrypted information ([Encrypted PII]), the identity verification processing device 30 transmits a request for registration of the encrypted information to the block chain system 2 (Step S15). When transmitting the request for registration of the encrypted information, the identity verification processing device 30 generates user identification information ([PII-ID]) unique to the user of the user terminal 10 who is the identity verified user, and encloses the user identification information together with the encrypted information ([Encrypted PII]) in the registration request. In the block chain system 2, the user identification information ([PII-ID]) and the encrypted information ([Encrypted PII]) are managed in association with each other.

Then, the identity verification processing device 30 returns the random number ([Secret]), which is the secret information generated in Step S13, to the user terminal 10 (Step S16). The identity verification processing device 30 transmits the user identification information ([PII-ID]) together when returning the random number ([Secret]) as secret information to the user terminal 10.

Upon receiving the random number ([Secret]) as secret information from the identity verification processing device 30, the user terminal 10 stores the random number in the storage unit 17 in association with the user identification information ([PII-ID]) received together with the secret information (Step S17). As described above, the procedure of the identity verification process and the process related to registration of encrypted information in the information processing system 1 is completed.

As described above, according to the information processing system 1 according to the embodiment, the encrypted information ([Encrypted PII]) obtained by encrypting the identity verification information used in the identity verification process is managed as public information in the block chain system 2. As a result, the encrypted information managed in the block chain system 2 can be shared by a plurality of services requiring identity verification. For this reason, the service user can simplify the procedure when using a plurality of services which requires identity verification by single identity verification by the identity verification service. On the other hand, since the service provider can acquire the encrypted information from the block chain system 2 and use the encrypted information as necessary, it is not necessary to go through a procedure of acquiring the identity verification information from the service user, and the procedure of the identity verification can be simplified.

<3-2. Procedure of Process Related to Generation and Verification of Proof Information>

Figure 6:
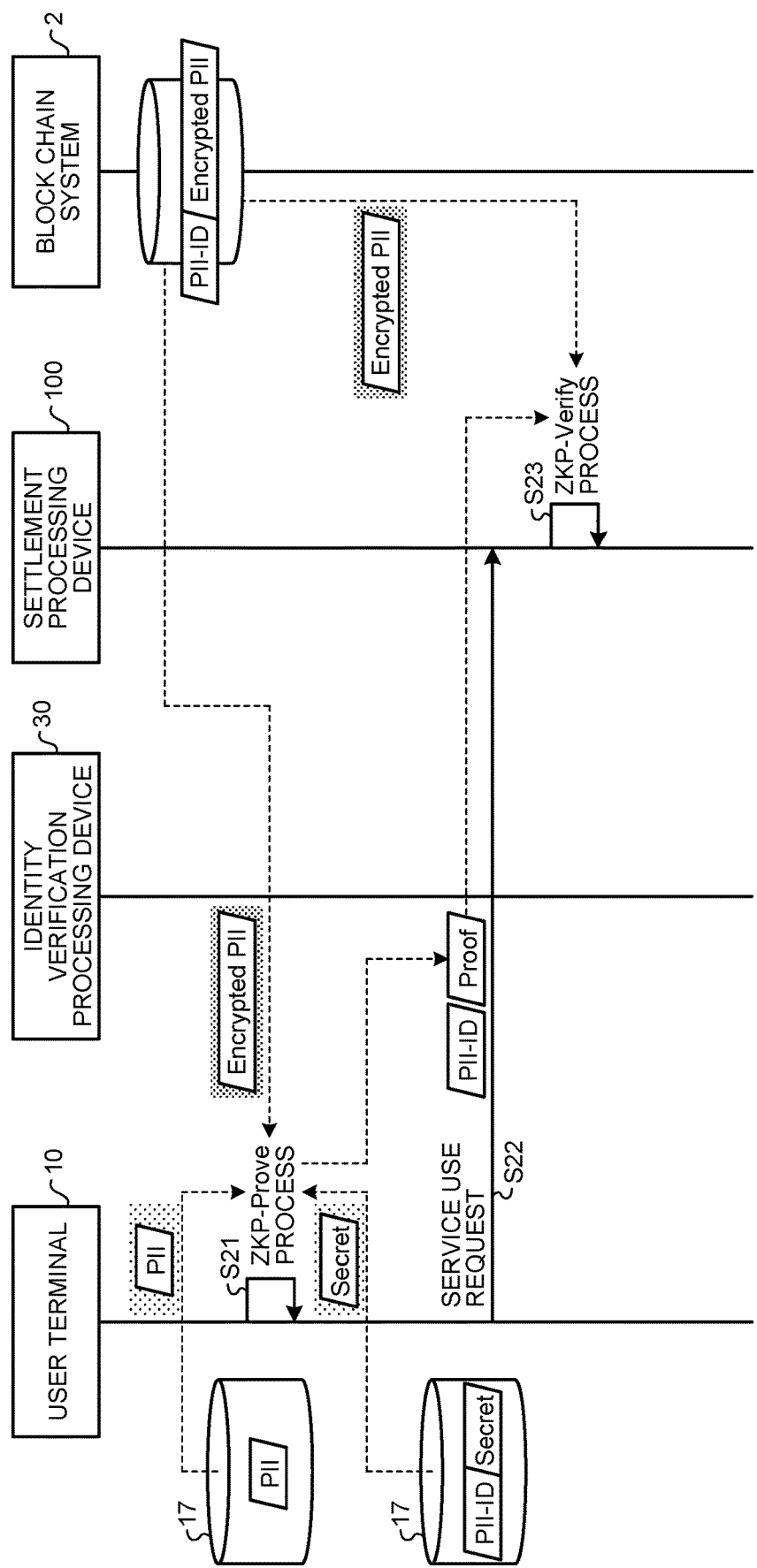
FIG. 6 is a diagram illustrating an example of a procedure of a process related to generation and verification of proof information according to the embodiment.

With reference to FIG. 6, a procedure of a process related to generation and verification of proof information according to the embodiment will be described. FIG. 6 is a diagram illustrating an example of a procedure of a process related to generation and verification of proof information according to the embodiment.

As illustrated in FIG. 6, the user terminal 10 executes the "ZKP-Prove" process of generating proof information ([Proof]: proof) for proving, by zero knowledge proof, that identity verification has been completed when requesting of the settlement processing device 100 for use of the service (Step S21). The "ZKP-Prove" process is executed based on the identity verification information ([PII]), the random number ([Secret]), and the encrypted information ([Encrypted PII]). The encrypted information ([Encrypted PII]) is acquired from the block chain system 2 based on the user identification information ([PII-ID]).

When generating the proof information ([Proof]: proof) by the "ZKP-Prove" process, the user terminal 10 transmits a service use request to the settlement processing device 100 (Step S22). For example, the user terminal 10 encloses the proof information ([Proof]: proof) generated in Step S21 and the user identification information ([PII-ID]) allocated from the identity verification processing device 30 in the service use request.

The settlement processing device 100 that has received the service use request executes the verification process ("ZKP-Verify" process) of the proof information ([Proof]: proof) included in the service use request (Step S23). The "ZKP-Verify" process is performed by acquiring, from the block chain system 2, the encrypted information ([Encrypted PII]) associated with the user identification information ([PII-ID]) acquired by the acquisition unit 131. By the "ZKP-Verify" process, whether the proof information acquired from the user terminal 10 is created based on the random number which is secret information that only the identity verified user is allowed to know is verified. That is, by the "ZKP-Verify" process, whether the service use request is from the identity verified user who has completed the identity verification process is proved. When it is proved that the user as the service request source the has completed the identity verification process, the settlement processing device 100 executes a process for providing a service to the user who is a request source for the service. As described above, the procedure of the process related to the generation and verification of the proof information in the information processing system 1 is completed.

As described above, according to the information processing system 1 according to the embodiment, the encrypted information ([Encrypted PII]) obtained by encrypting the identity verification information used in the identity verification process is managed as public information in the block chain system 2. That is, since the identity verification information managed as public information in the block chain system 2 is encrypted, the privacy of the service user can be protected. In addition, by using the zero knowledge proof, the service user can prove to the service provider that the identity verification has been completed by using the proof information corresponding to the encrypted information managed in the block chain system 2 without disclosing the identity verification information itself. On the other hand, the service provider can acquire the encrypted information required for identity verification from the encrypted information managed in the block chain system 2 and verify, by the zero knowledge proof, whether the service user is identity verified. Therefore, it is possible to simplify the procedure of identity verification in both the service user and the service provider while protecting the privacy of the service user.

<3-3. User Registration Process>

Figure 7:
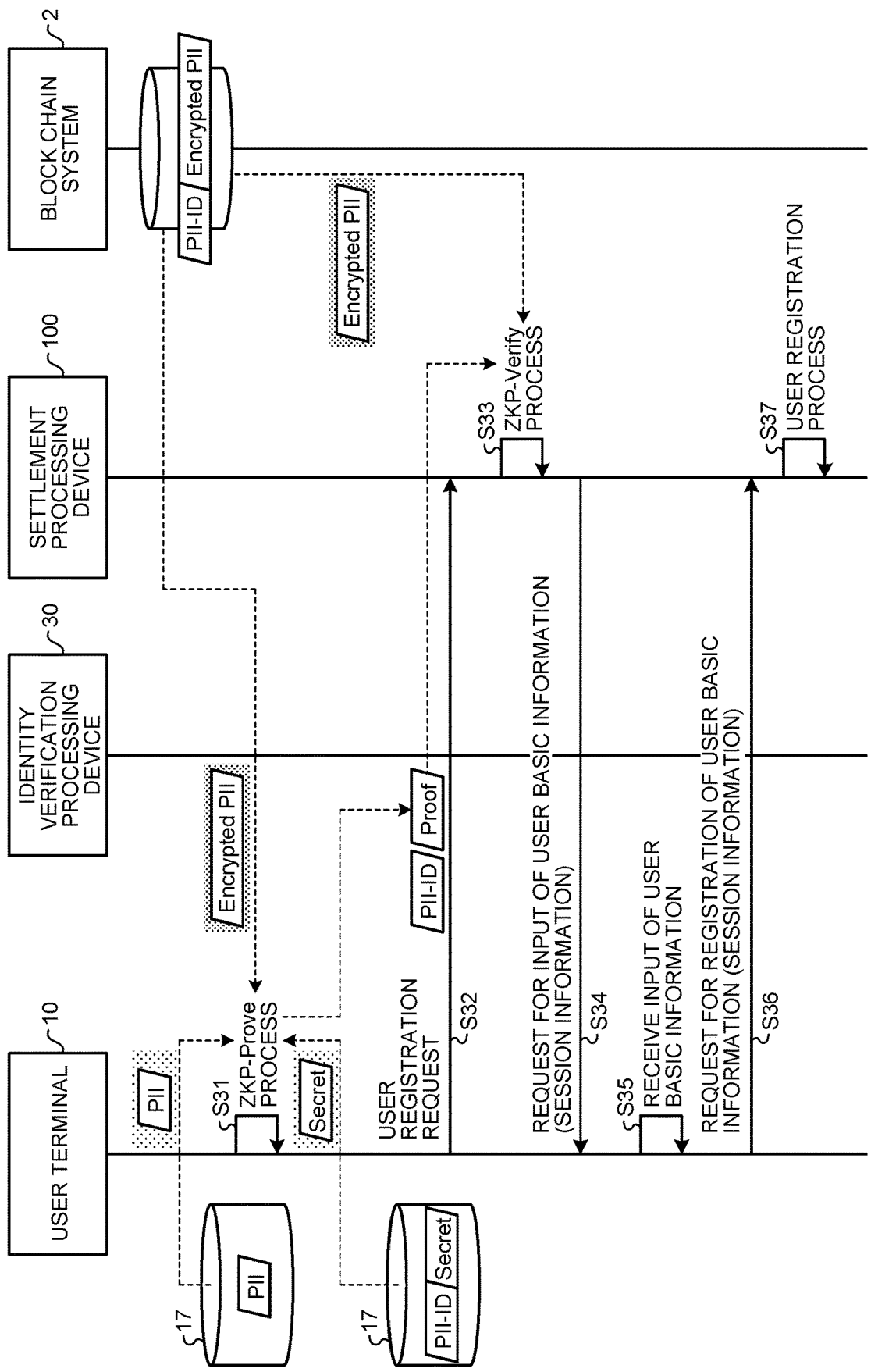
FIG. 7 is a diagram illustrating an example of a procedure of a user registration process according to the embodiment.

A procedure of the user registration process according to the embodiment will be described with reference to FIG. 7. FIG. 7 is a diagram illustrating an example of a procedure of the user registration process according to the embodiment. The procedure of the process illustrated in FIG. 7 can be executed, for example, when the user of the user terminal 10 uses the service provided by the settlement processing device 100.

As illustrated in FIG. 7, the user terminal 10 executes the "ZKP-Prove" process in transmitting the user registration request to the settlement processing device 100 (Step S31). The "ZKP-Prove" process is a process similar to the example illustrated in FIG. 6 described above, and is a process for generating proof information ([Proof]: proof) for proving, by zero knowledge proof, that identity verification has been completed. The "ZKP-Prove" process is executed based on the identity verification information ([PII]), the random number ([Secret]), and the encrypted information ([Encrypted PII]). The encrypted information ([Encrypted PII]) is acquired from the block chain system 2 based on the user identification information ([PII-ID]).

When generating the proof information ([Proof]: proof) by the "ZKP-Prove" process, the user terminal 10 transmits a user registration request to the settlement processing device 100 (Step S32). For example, the user terminal 10 encloses the proof information ([Proof]: proof) generated in Step S31 and the user identification information ([PII-ID]) allocated from the identity verification processing device 30 in the user registration request.

The settlement processing device 100 that has received the user registration request executes the verification process ("ZKP-Verify" process) of the proof information ([Proof]: proof) included in the user registration request (Step S33). The "ZKP-Verify" process is performed by acquiring, from the block chain system 2, the encrypted information ([Encrypted PII]) associated with the user identification information ([PII-ID]) acquired by the acquisition unit 131. By the "ZKP-Verify" process, whether the proof information ([Proof]: proof) acquired from the user terminal 10 is created based on the random number ([Secret]) which is secret information that only the identity verified user is allowed to know is verified. That is, by the "ZKP-Verify" process, whether the user registration request is from the identity verified user who has completed the identity verification process is proved.

When completion of the identity verification process is proved for the user of the user terminal 10 who is a request source in the user registration, the settlement processing device 100 transmits a request for input of user basic information for user registration to the user terminal 10 (Step S34). When transmitting the request for input of the user basic information, the settlement processing device 100 includes, in the request for input of the user basic information, session information for identifying a session established with the user terminal 10. The settlement processing device 100 acquires the user basic information from the user terminal 10 through, for example, an input form provided to the user of the user terminal 10 via the session.

The user terminal 10 that has received the request for input of the user basic information notifies the user that the request for input of the user basic information has been received, and receives the input of the user basic information input from the user (Step S35).

When the input of the user basic information by the user is completed, the user terminal 10 transmits a request for registration of the user basic information to the settlement processing device 100 through the session established by the settlement processing device 100 (Step S36). The request for registration of the user basic information includes session information for identifying the session established by the settlement processing device 100.

The settlement processing device 100 that has received the request for registration of the user basic information executes the user registration process (Step S37). The above is an example of the procedure of the user registration process executed in the information processing system 1.

As described above, according to the information processing system 1 according to the embodiment, in the user registration request at the time of using the service, the service user can prove that the identity verification has been completed by the zero knowledge proof without disclosing the identity verification information itself. Further, the service provider can appropriately acquire and use the encrypted information from the block chain system 2 at the time of identity verification in the user registration request. Therefore, in the identity verification in the user registration at the time of using the service, it is possible to simplify the identity verification for both the service user and the service provider while protecting the privacy of the service user.

<3-4. Anonymous User Registration Process>

Figure 8:
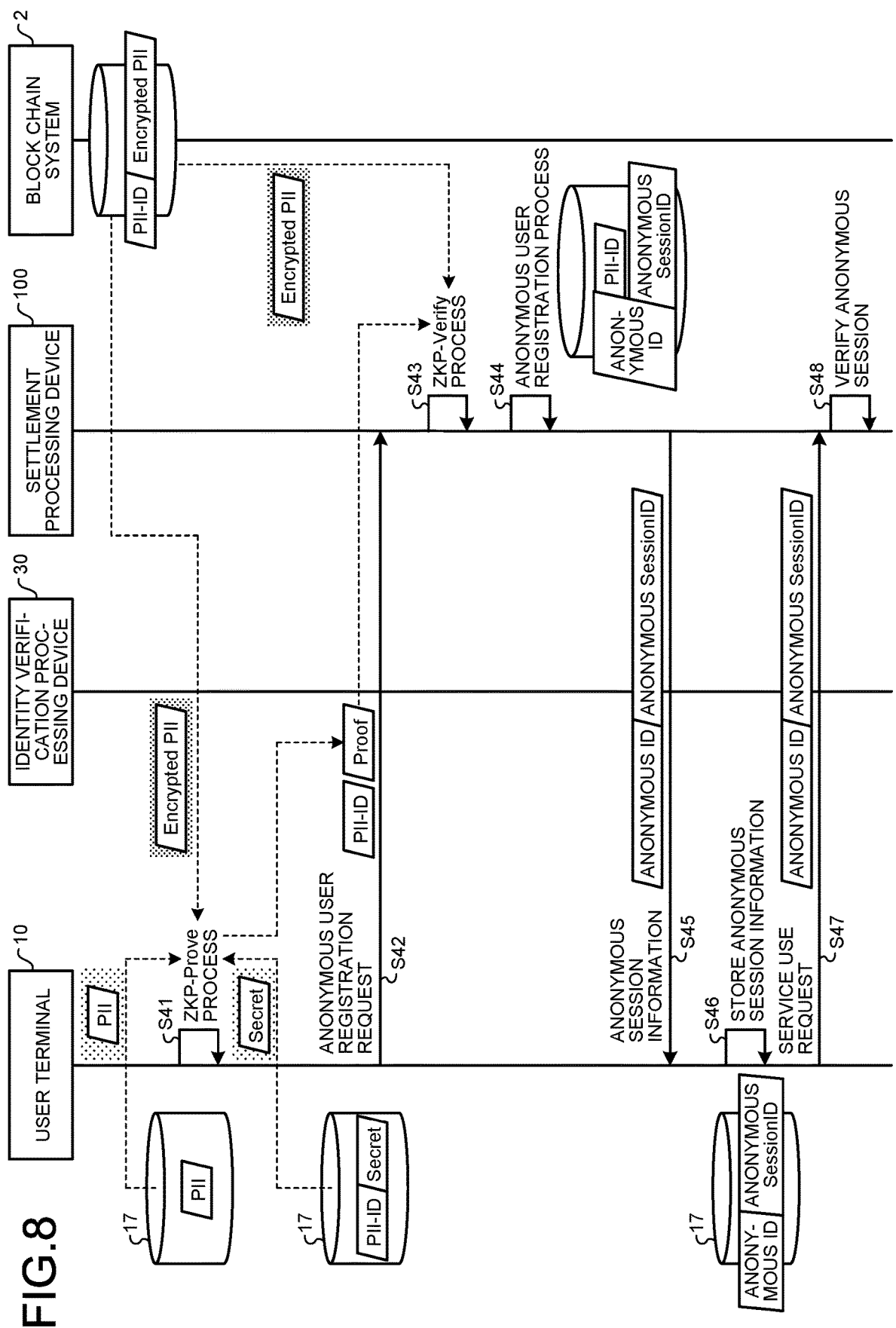
FIG. 8 is a diagram illustrating an example of a procedure of user registration process according to the embodiment.

A procedure of the user registration process according to the embodiment will be described with reference to FIG. 8. FIG. 8 is a diagram illustrating an example of a procedure of the user registration process according to the embodiment. The procedure of the process illustrated in FIG. 8 can be executed, for example, when the user of the user terminal 10 uses the service provided by the settlement processing device 100.

As illustrated in FIG. 8, the user terminal 10 executes the "ZKP-Prove" process in transmitting the anonymous user registration request to the settlement processing device 100 (Step S41). The "ZKP-Prove" process is a process similar to the example illustrated in FIG. 6 described above, and is a process for generating proof information ([Proof]: proof) for proving, by zero knowledge proof, that identity verification has been completed. The "ZKP-Prove" process is executed based on the identity verification information ([PII]), the random number ([Secret]), and the encrypted information ([Encrypted PII]). The encrypted information ([Encrypted PII]) is acquired from the block chain system 2 based on the user identification information ([PII-ID]).

When generating the proof information ([Proof]: proof) by the "ZKP-Prove" process, the user terminal 10 transmits an anonymous user registration request to the settlement processing device 100 (Step S42). For example, the user terminal 10 encloses the proof information ([Proof]: proof) generated in Step S41 and the user identification information ([PII-ID]) allocated from the identity verification processing device 30 in the anonymous user registration request.

The settlement processing device 100 that has received the user registration request executes the verification process ("ZKP-Verify" process) of the proof information ([Proof]: proof) included in the user registration request (Step S43). The "ZKP-Verify" process is performed by acquiring, from the block chain system 2, the encrypted information ([Encrypted PII]) associated with the user identification information ([PII-ID]) acquired by the acquisition unit 131. By the "ZKP-Verify" process, whether the proof information ([Proof]: proof) acquired from the user terminal 10 is created based on the random number ([Secret]) which is secret information that only the identity verified user is allowed to know is verified. That is, by the "ZKP-Verify" process, whether the anonymous user registration request is from the identity verified user who has completed the identity verification process is proved.

When completion of the identity verification process is proved for the user of the user terminal 10 who is a request source in the anonymous user registration, the settlement processing device 100 executes the anonymous user registration process (Step S44). The settlement processing device 100 generates an anonymous ID and an anonymous session ID unique to the user who is a request source for anonymous user registration, and manages the anonymous ID and the anonymous session ID in association with user identification information ([PII-ID]) included in the anonymous user registration request. The anonymous session ID is information for identifying an anonymous session.

Following the anonymous user registration process, the settlement processing device 100 transmits the anonymous session information to the user terminal 10 (Step S45). The anonymous session information includes the anonymous ID and the anonymous session ID.

The user terminal 10 that has received the anonymous session information stores the anonymous session information (Step S46) to transmit a service use request to the settlement processing device 100 by using the anonymous session information (Step S47).

The settlement processing device 100 that has received the service use request verifies the anonymous session information included in the service use request (Step S48). In a case where the verification of the anonymous session information is successful, the settlement processing device 100 provides a service from the settlement processing device 100 to the user terminal 10 through the anonymous session.

As described above, according to the information processing system 1 according to the embodiment, in the anonymous user registration request at the time of using the service, the service user can prove that the identity verification has been completed by zero knowledge proof without disclosing the identity verification information itself. In addition, the service provider can appropriately acquire and use the encrypted information from the block chain system 2 at the time of identity verification for responding to the anonymous user registration request. Therefore, in the identity verification in the anonymous user registration at the time of using the service, it is possible to simplify the identity verification for both the service user and the service provider while protecting the privacy of the service user.

<3-5. Remittance Process>

Figure 9:
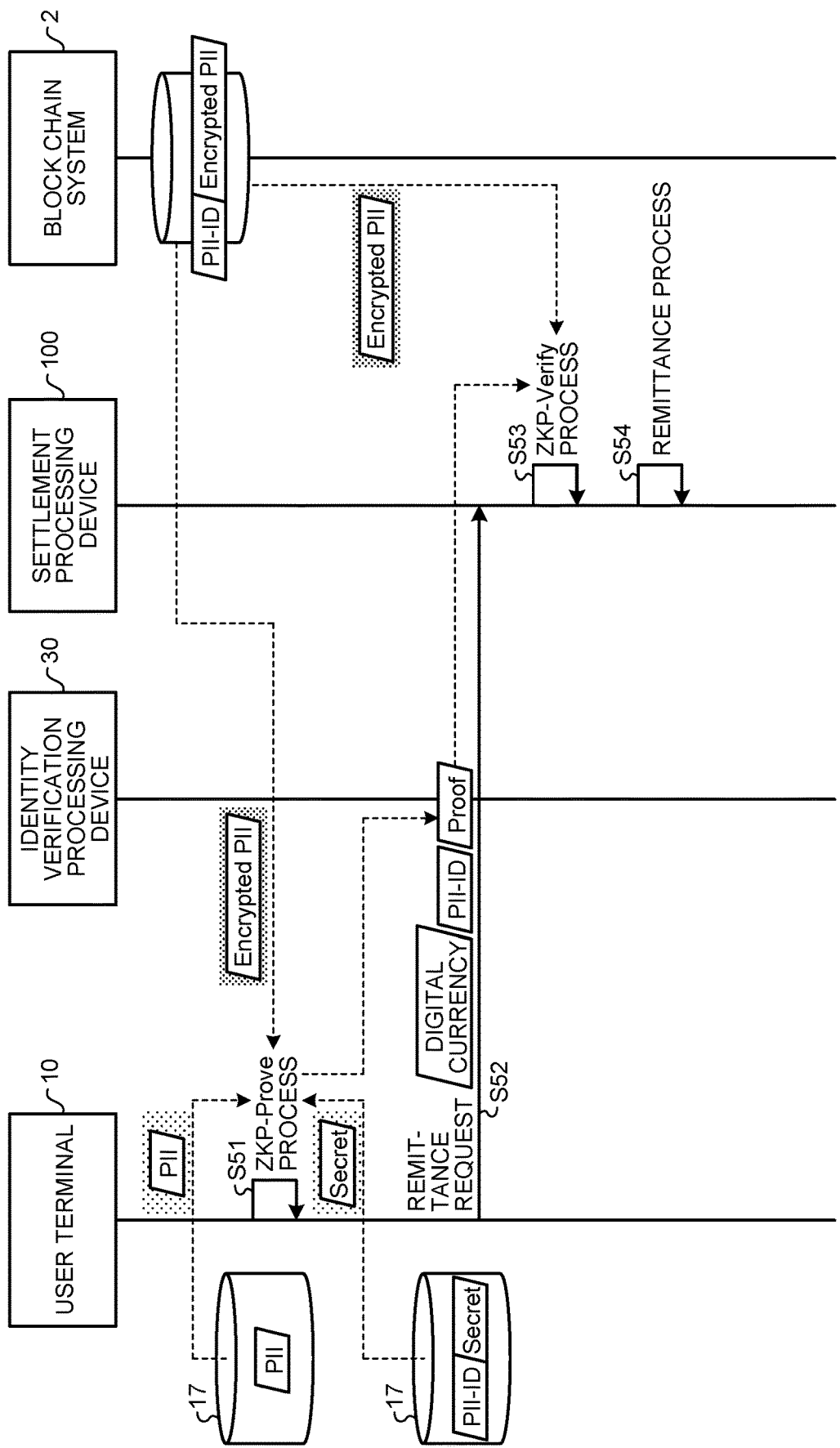
FIG. 9 is a diagram illustrating an example of a procedure of a remittance process according to the embodiment.

A procedure of a remittance process according to the embodiment will be described with reference to FIG. 9. FIG. 9 is a diagram illustrating an example of a procedure of the remittance process according to the embodiment.

As illustrated in FIG. 9, the user terminal 10 executes the "ZKP-Prove" process in transmitting a remittance request to the settlement processing device 100 (Step S51). The "ZKP-Prove" process is a process similar to the example illustrated in FIG. 6 described above, and is a process for generating proof information ([Proof]: proof) for proving, by zero knowledge proof, that identity verification has been completed. The "ZKP-Prove" process is executed based on the identity verification information ([PII]), the random number ([Secret]), and the encrypted information ([Encrypted PII]). The encrypted information ([Encrypted PII]) is acquired from the block chain system 2 based on the user identification information ([PII-ID]).

When generating the proof information ([Proof]: proof) by the "ZKP-Prove" process, the user terminal 10 transmits a remittance request to the settlement processing device 100 (Step S52). For example, the user terminal 10 encloses the proof information ([Proof]: proof) generated in Step S51, the user identification information ([PII-ID]) allocated from the identity verification processing device 30, and the information about the remittance of the digital currency in the transmission request.

The settlement processing device 100 that has received the remittance request executes the verification process ("ZKP-Verify" process) of the proof information ([Proof]: proof) included in the user registration request (Step S53). The "ZKP-Verify" process is performed by acquiring, from the block chain system 2, the encrypted information ([Encrypted PII]) associated with the user identification information ([PII-ID]) acquired by the acquisition unit 131. By the "ZKP-Verify" process, whether the proof information ([Proof]: proof) acquired from the user terminal 10 is created based on the random number ([Secret]) which is secret information that only the identity verified user is allowed to know is verified. That is, by the "ZKP-Verify" process, whether the remittance request is from the identity verified user who has completed the identity verification process is proved.

When completion of the identity verification process is proved for the user of the user terminal 10 who is a request source for the user registration, the settlement processing device 100 executes the remittance process of digital currency included in the remittance request (Step S54).

As described above, according to the information processing system 1 according to the embodiment, when using the remittance service provided by the settlement processing device 100, the service user can prove that the identity verification has been completed by the zero knowledge proof without disclosing the identity verification information itself. In addition, the service provider can appropriately acquire and use encrypted information from the block chain system 2 at the time of identity verification for responding to the remittance request. Therefore, in the identity verification in the remittance service, it is possible to simplify the identity verification in both the user of the service and the provider of the service while protecting the privacy of the user of the service.

<<4. Modifications>>
<4-1. Registration of Credit Score>

Figure 10:
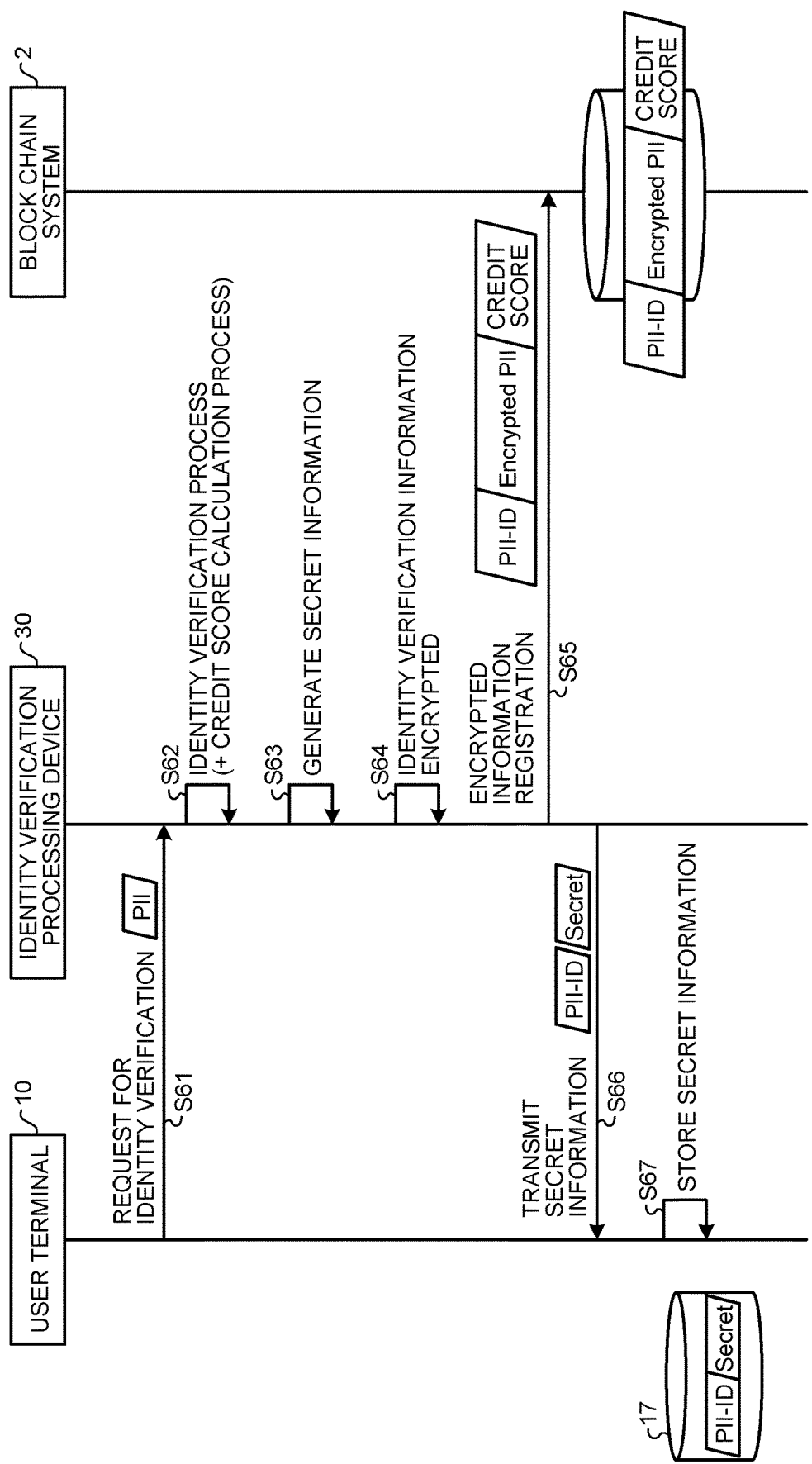
FIG. 10 is a diagram illustrating an example of a procedure of an identity verification process and a process related to registration of encrypted information according to the modification.

In the above embodiment, when the encrypted information of the user of the user terminal 10 is registered in the block chain system 2, the credit score of the user terminal 10 may be registered. FIG. 10 is a diagram illustrating an example of a procedure of an identity verification process and a process related to registration of encrypted information according to the modification. The procedure of the process illustrated in FIG. 10 is basically similar to the procedure of the process illustrated in FIG. 5, but is different from the procedure of the process illustrated in FIG. 5 in that the credit score of the user of the user terminal 10 is registered in the block chain system 2.

That is, as illustrated in FIG. 10, the user terminal 10 transmits an identity verification request for requesting implementation of the identity verification process to the identity verification processing device 30 (Step S61). For example, when transmitting the identity verification request, the user terminal 10 can enclose identity verification information used for the identity verification process.

The identity verification processing device 30 that has received the identity verification request executes the identity verification process (Step S62). In addition, the identity verification processing device 30 generates secret information (random number) associated with the user of the user terminal 10 who is a request source for the identity verification process (Step S63). In addition, the identity verification processing device 30 executes the credit score calculation process of calculating a credit score of the user of the user terminal 10 in the identity verification process. The credit score is used, for example, in the loan examination process (see FIG. 11) in the settlement processing device 100.

Subsequently, the identity verification processing device 30 generates encrypted information ([Encrypted PII]) obtained by encrypting the identity verification information used in the identity verification process in Step S62 by using the random number ([Secret]) that is the secret information generated in Step S13 (Step S64).

After generating the encrypted information ([Encrypted PII]), the identity verification processing device 30 transmits a request for registration of the encrypted information to the block chain system 2 (Step S65). When transmitting the request for registration of the encrypted information, the identity verification processing device 30 generates the user identification information ([PII-ID]) unique to the user of the user terminal 10 who is the identity verified user, and encloses the user identification information together with the encrypted information ([Encrypted PII]) and the credit score in the registration request. In the block chain system 2, the user identification information ([PII-ID]), the encrypted information ([Encrypted PII]), and the credit score are managed in association with each other.

Then, the identity verification processing device 30 returns the random number ([Secret]), which is the secret information generated in Step S63, to the user terminal 10 (Step S66). The identity verification processing device 30 transmits the user identification information ([PII-ID]) together when returning the random number ([Secret]) as secret information to the user terminal 10.

Upon receiving the random number ([Secret]) as secret information from the identity verification processing device 30, the user terminal 10 stores the random number in the storage unit 17 in association with the user identification information ([PII-ID]) received together with the secret information (Step S67).

<4-2. Loan Examination Process>

Figure 11:
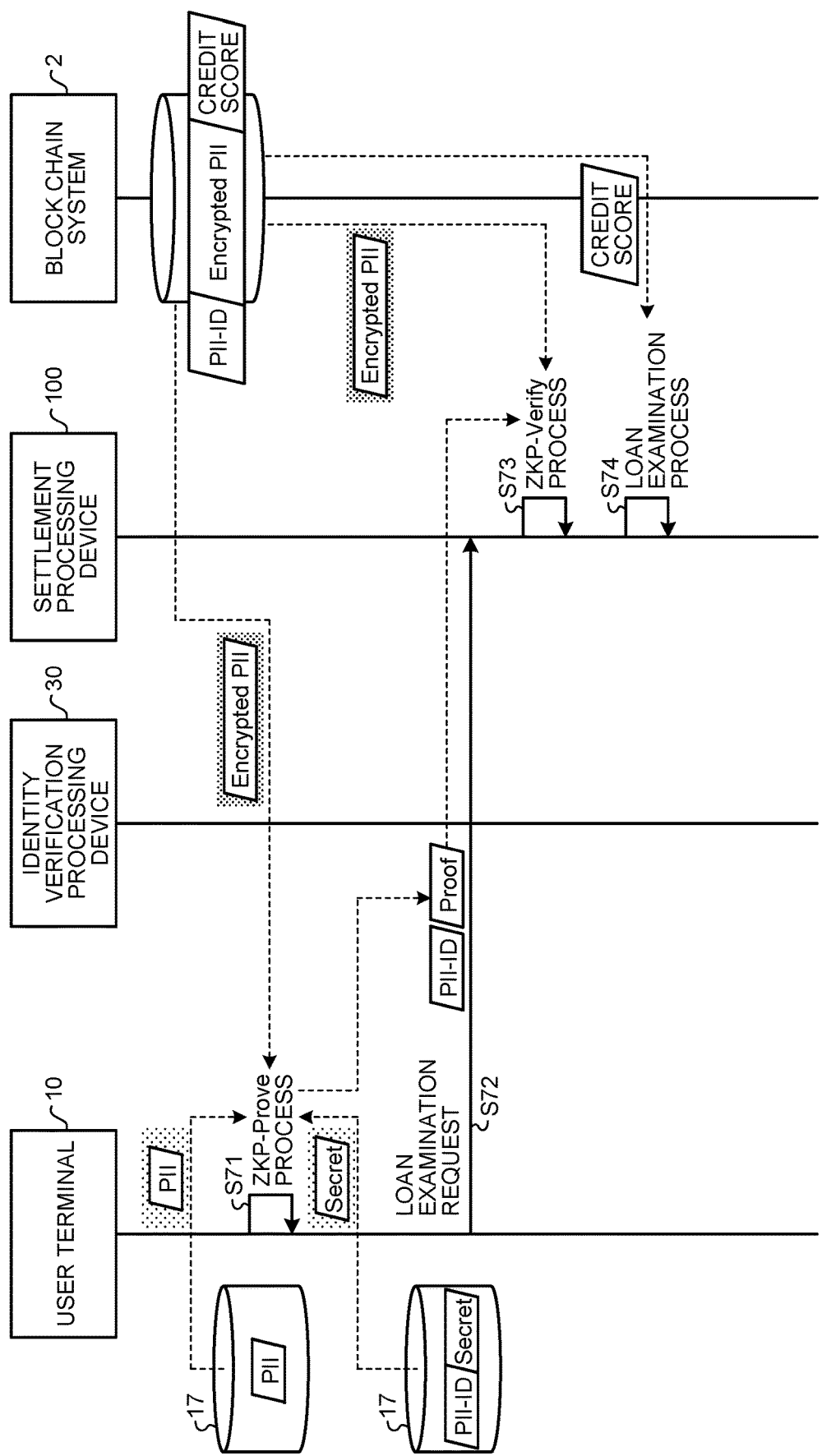
FIG. 11 is a diagram illustrating an example of a procedure of a loan examination process according to the modification.

A procedure of the remittance process according to the embodiment will be described with reference to FIG. 11. FIG. 11 is a diagram illustrating an example of a procedure of a loan examination process according to the modification.

As illustrated in FIG. 11, the user terminal 10 executes the "ZKP-Prove" process in transmitting a remittance request to the settlement processing device 100 (Step S71). The "ZKP-Prove" process is a process similar to the example illustrated in FIG. 6 described above, and is a process for generating proof information ([Proof]: proof) for proving, by zero knowledge proof, that identity verification has been completed. The "ZKP-Prove" process is executed based on the identity verification information ([PII]), the random number ([Secret]), and the encrypted information ([Encrypted PII]). The encrypted information ([Encrypted PII]) is acquired from the block chain system 2 based on the user identification information ([PII-ID]).

When generating the proof information ([Proof]: proof) by the "ZKP-Prove" process, the user terminal 10 transmits a loan examination request to the settlement processing device 100 (Step S72). For example, the user terminal 10 encloses the proof information ([Proof]: proof) generated in Step S71 and the user identification information ([PII-ID]) allocated from the identity verification processing device 30 in the loan examination request.

The settlement processing device 100 that has received the loan examination request executes the verification process ("ZKP-Verify" process) of the proof information ([Proof]: proof) included in the loan examination request (Step S73). The "ZKP-Verify" process is performed by acquiring, from the block chain system 2, the encrypted information ([Encrypted PII]) associated with the user identification information ([PII-ID]) acquired by the acquisition unit 131. By the "ZKP-Verify" process, whether the proof information ([Proof]: proof) acquired from the user terminal 10 is created based on the random number ([Secret]) which is secret information that only the identity verified user is allowed to know is verified. That is, by the "ZKP-Verify" process, whether the remittance request is from the identity verified user who has completed the identity verification process is proved.

When completion of the identity verification process is proved for the user of the user terminal 10 who is a request source for the loan examination, the settlement processing device 100 executes the loan examination process based on the credit score of the user of the user terminal 10 who is a request source for the loan examination (Step S74). The credit score is acquired from the block chain system 2 based on the user identification information ([PII-ID]).

As described above, according to the information processing system 1 according to the embodiment, when using the loan service provided by the settlement processing device 100, the service user can prove that the identity verification has been completed by the zero knowledge proof without disclosing the identity verification information itself. In addition, the service provider can appropriately acquire and use the credit score from the block chain system 2 together with the encrypted information at the time of identification for responding to the loan examination request. Therefore, in the identity verification in the remittance service, it is possible to simplify the identity verification in both the user of the service and the provider of the service while protecting the privacy of the user of the service.

<4-3. Use of a Plurality of Identity Verification Service Operators>

Figure 12:
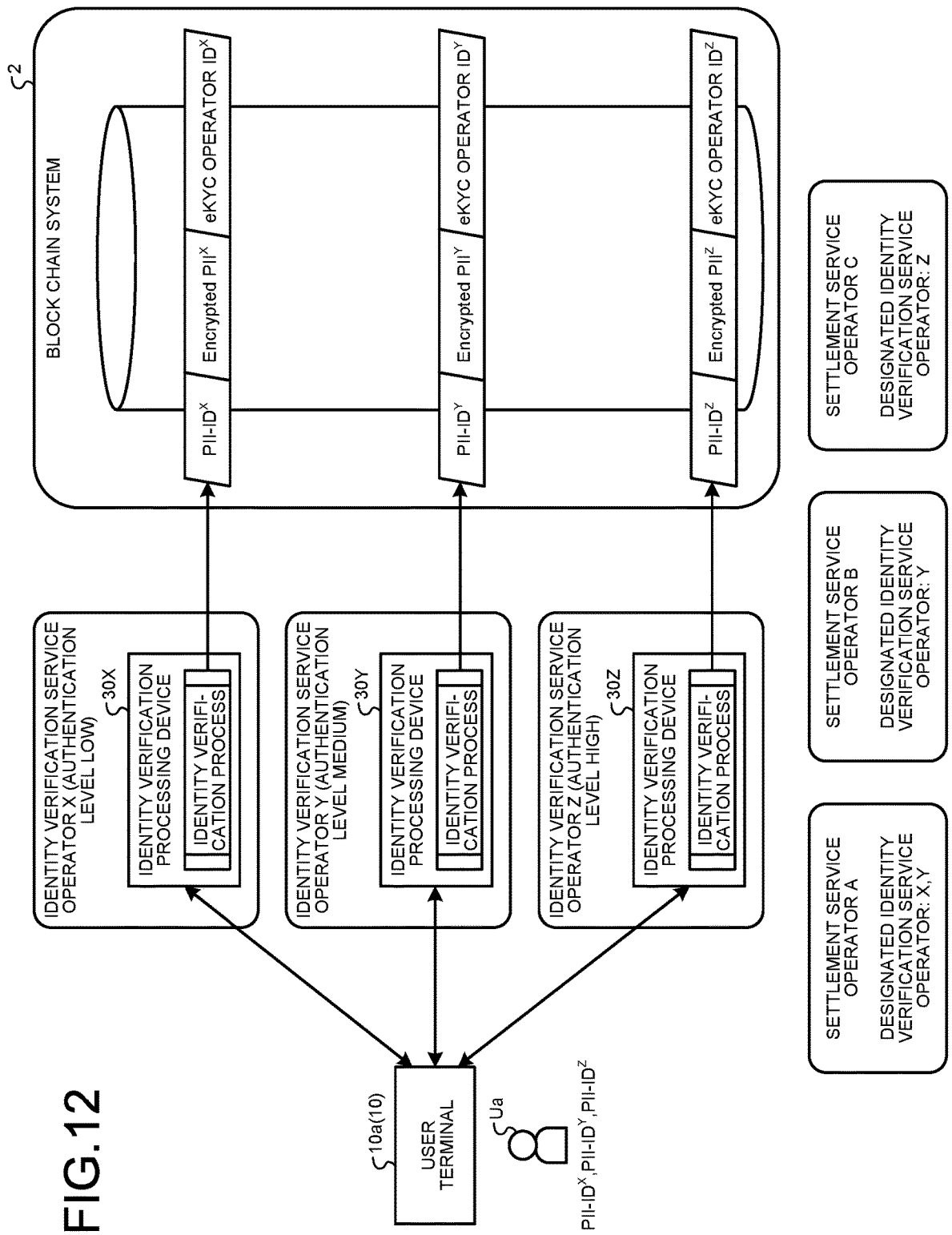
FIG. 12 is a diagram illustrating an outline of use by a plurality of identity verification service operators according to the modification.

Depending on the service that requires identity verification, it is assumed that use of a specific operator among a plurality of operators that provides the identity verification service is required, or available operators are restricted depending on social credibility of the operator, or the like. Therefore, the user of the user terminal 10 who is the service user may execute the identity verification process using a plurality of operators providing the identity verification service, and manage the result of the identity verification process by each operator in the block chain system 2. FIG. 12 is a diagram illustrating an outline of use of a plurality of identity verification service operators according to the modification.

As illustrated in FIG. 12, for example, a user Ua of a user terminal 10a can use each of the identity verification service operators X, Y, and Z by transmitting an identity verification request to each of the identity verification service operators X, Y, and Z (See, for example, FIG. 5).

Each of the identity verification service operators X, Y, and Z is an operator capable of performing the identity verification process according to an identity verification method required by each service that requires identity verification. The authentication level of identity verification required by each service may be determined according to an arbitrary standard such as necessity of multi-stage authentication or multi-factor authentication (MFA) or necessity of a method defined by law.

For example, a service that does not require identity verification by multi-factor authentication can be a service whose required authentication level is not high ("authentication level: low"). In addition, a service that requires identity verification by multi-factor authentication can be a service whose required authentication level is medium ("authentication level: medium"). In addition, a service that requires identity verification specified by law can be a service whose required authentication level is high ("authentication level: high"). In the example illustrated in FIG. 12, the identity verification service operators X, Y, and Z are operators capable of performing identity verification according to each of a service whose required authentication level is not high, a service whose required authentication level is medium, and a service whose required authentication level is high.

In a service that does not require identity verification by multi-factor authentication (a service with an "authentication level: low"), basic personal information such as a name, an address, and a date of birth is assumed to be used in the identity verification process. Furthermore, as an identity verification method, it is assumed that information presented by the user is unconditionally used.

It is assumed that a service provider who provides a service that does not require identity verification by multi-factor authentication (a service with an "authentication level: low") requests the service user to perform identity verification by the identity verification service operator X. For example, in a case where the settlement service operator A provides a service that does not require identity verification by multi-factor authentication (a service with an "authentication level: low"), it is assumed that the user Ua is requested to perform identity verification by the identity verification service operator X.

Therefore, the user Ua of the user terminal 10a requests the identity verification service operator X to perform the identity verification process. An identity verification processing device 30X operated by the identity verification service operator X executes the identity verification process of the user Ua. The identity verification processing device 30X transmits, to the block chain system 2, an identity verification registration request of encrypted information ([Encrypted PII$^X$]) obtained as a result of the identity verification process and user identification information ([PII-ID$^X$]) uniquely assigned to the user Ua.

Upon receiving the identity verification registration request from the identity verification processing device 30X, the block chain system 2 pays out and assigns a unique operator ID ([eKYC operator ID$^x$]) to the identity verification service operator X who is a request source for the identity verification registration. The block chain system 2 manages, for example, the user identification information ([PII-ID$^X$]), the encrypted information ([Encrypted PII$^X$]), and the operator ID ([eKYC operator ID$^x$]) in association with each other as information indicating that identity verification has been completed, in the block chain system 2.

When using the service provided by the settlement service operator A, the user Ua of the user terminal 10a transmits a service request to the settlement service operator A by using the user identification information ([PII-ID$^X$]) given by the identity verification service operator X. The settlement service operator A can acquire the encrypted information ([Encrypted PII$^X$]) and the operator ID ([eKYC operator ID$^x$]) from the block chain system 2 based on the user identification information ([PII-ID$^X$]) included in the service request, and verify the service request.

In a service requiring identity verification by multi-factor authentication (a service with an "authentication level: medium"), it is assumed that some pieces of information from knowledge information, possession information, and biometric information are combined and used in the identity verification process. For example, a password, a PIN code, a secret question, and the like are exemplified as the knowledge information, a cellular phone (a telephone number or an e-mail address), a hardware token, an IC card, and the like are exemplified as the possession information, and a fingerprint, a vein, a voiceprint, and the like are exemplified as the biometric information. In addition, as an example of an identity verification method, a method of performing login using knowledge information, then, transmitting an e-mail with an authentication code to a registered e-mail address, and confirming receipt of the e-mail by presenting the authentication code is exemplified. The login to the service can be performed using any identity proof algorithm set by the user. The identity proof algorithm includes, for example, matching between a name and a password, matching between a name and a plurality of secret catchwords, positions of a name and a face image, matching between a name and a fingerprint, and the like. As a login method, matching between a name and a password, matching between a name and a plurality of secret catchwords, matching between a name and a face image, matching between a name and a fingerprint, or the like can be employed. Other examples of the data that can be handled as the identity proof algorithm include secret information such as a card number, a combination of known information, sensing data, a My Number (Social Security and Tax Number), and credit card information. Examples of the combination of known information include a family name, a home address or a telephone number, a parent's address or telephone number, and a parent's maiden name. Examples of the sensing data include, in addition to the above-described fingerprint, position information of a specific place such as home, and biometric information such as iris, face, and gait.

In the identity proof algorithm, conditional expressions such as perfect coincidence, ambiguity coincidence, magnitude comparison, and inclusion relationship can be appropriately employed according to the data exchanged in the identity proof algorithm. In the case of an identity proof algorithm that handles a password, a secret catchword, and biometric information, perfect coincidence can be employed as a conditional expression. In the case of an identity proof algorithm that handles biometric information and a secret catchword, ambiguity coincidence can be employed as a conditional expression. In the case of an identity proof algorithm that handles position information, for example, an inclusion relationship such as whether the position information is included in a specific area can be employed as the conditional expression. A combination of data and conditional expressions that are handled in the identity proof algorithm may be an AND condition or an OR condition.

It is assumed that a service provider who provides a service requiring identity verification by multi-factor authentication (a service with an "authentication level: medium") requests a service user to perform identity verification by the identity verification service operator Y. For example, in a case where the settlement service operator B provides a service requiring identity verification by multi-factor authentication (a service with an "authentication level: medium"), it is assumed that the user Ua is requested to perform identity verification by the identity verification service operator Y.

Therefore, the user Ua of the user terminal 10a requests the identity verification service operator Y to perform the identity verification process. The identity verification processing device 30Y operated by the identity verification service operator Y executes the identity verification process of the user Ua. The identity verification processing device 30Y transmits, to the block chain system 2, an identity verification registration request of the encrypted information ([Encrypted $PIT^Y$]) obtained as a result of the identity verification process and the user identification information ([PII-$ID^Y$]) uniquely assigned to the user Ua.

Upon receiving the identity verification registration request from the identity verification processing device 30Y, the block chain system 2 pays out and assigns a unique operator ID ([eKYC operator $ID^Y$]) to the identity verification service operator Y who is a request source in the identity verification registration. The block chain system 2 manages, for example, the user identification information ([PII-$ID^Y$]), the encrypted information ([Encrypted $PII^Y$]), and the operator ID ([eKYC operator $ID^Y$]) in association with each other as information indicating that identity verification has been completed.

When using the service provided by the settlement service operator B, the user Ua of the user terminal 10a transmits a service request to the settlement service operator A by using user identification information ([PII-$ID^Y$]) given by the identity verification service operator Y. The settlement service operator A can acquire the encrypted information ([Encrypted $PII^Y$]) and the operator ID ([eKYC operator $ID^Y$]) from the block chain system 2 based on the user identification information ([PII-$ID^Y$]) included in the service request, and verify the service request.

In a service that requires identity verification as defined by law (a service with an "authentication level: high"), it is assumed that an identity verification document with a face photograph and an identity verification document without a face photograph such as a copy of a health insurance card or a resident certificate are combined and used in the identity verification process. Examples of the identity verification document with a face photograph include a My Number card, a driver's license, and a passport. Examples of the identity verification document without a face photograph include a copy of a health insurance card or a resident certificate. In addition, as the identity verification method, methods such as uploading an identity verification document and a moving image showing an identity verification document and the person in question, or sending a copy of an identity verification document by mail are assumed.

It is assumed that a service provider who provides a service that requires identity verification specified by law (a service with an "authentication level: high") requests the service user to perform identity verification by the identity verification service operator Z. For example, in a case where the settlement service operator C provides a service that requires identity verification specified by law (a service with an "authentication level: high"), it is assumed that the user Ua is requested to perform identity verification by the identity verification service operator Z.

Therefore, the user Ua of the user terminal 10a requests the identity verification service operator Z to perform the identity verification process. The identity verification processing device 30Z operated by the identity verification service operator Z executes the identity verification process of the user Ua. The identity verification processing device 30Z transmits, to the block chain system 2, an identity verification registration request of the encrypted information ([Encrypted $PII^Z$]) obtained as a result of the identity verification process and the user identification information ([PII-$ID^Z$]) uniquely assigned to the user Ua.

Upon receiving the identity verification registration request from the identity verification processing device 30Z, the block chain system 2 pays out and assigns a unique operator ID ([eKYC operator $ID^Z$]) to the identity verification service operator Y who is a request source in the identity verification registration. The block chain system 2 manages, for example, the user identification information ([PII-$ID^Z$]), the encrypted information ([Encrypted $PII^Z$]), and the operator ID ([eKYC operator $ID^Z$]) in association with each other as information indicating that identity verification has been completed.

When using the service provided by the settlement service operator C, the user Ua of the user terminal 10a transmits a service request to the settlement service operator C using the user identification information ([PII-$ID^Z$]) given by the identity verification service operator Z. The settlement service operator C can acquire the encrypted information ([Encrypted $PII^Z$]) and the operator ID ([eKYC operator $ID^Z$]) from the block chain system 2 based on the user identification information ([PII-$ID^Z$]) included in the service request, and verify the service request.

As described above, the user Ua who is the service user performs the identity verification process for each of the different identity verification operators, whereby the identity verification at the time of using the service can be simplified even when the identity verification required by the service is different. On the other hand, each of the settlement service operators A to C, which are service providers, can acquire from the block chain system 2 and verify whether identity verification required by each of the settlement service operators is performed, and can simplify the identity verification while protecting the privacy of the service user.

In the example illustrated in FIG. 12, the user Ua may acquire the information of the identity verification service operator designated by the settlement service operators A to C from each operator in advance before the service request, or may acquire the information from each operator at the time of the service request.

<4-4. Verification of Operator>

Figure 13:
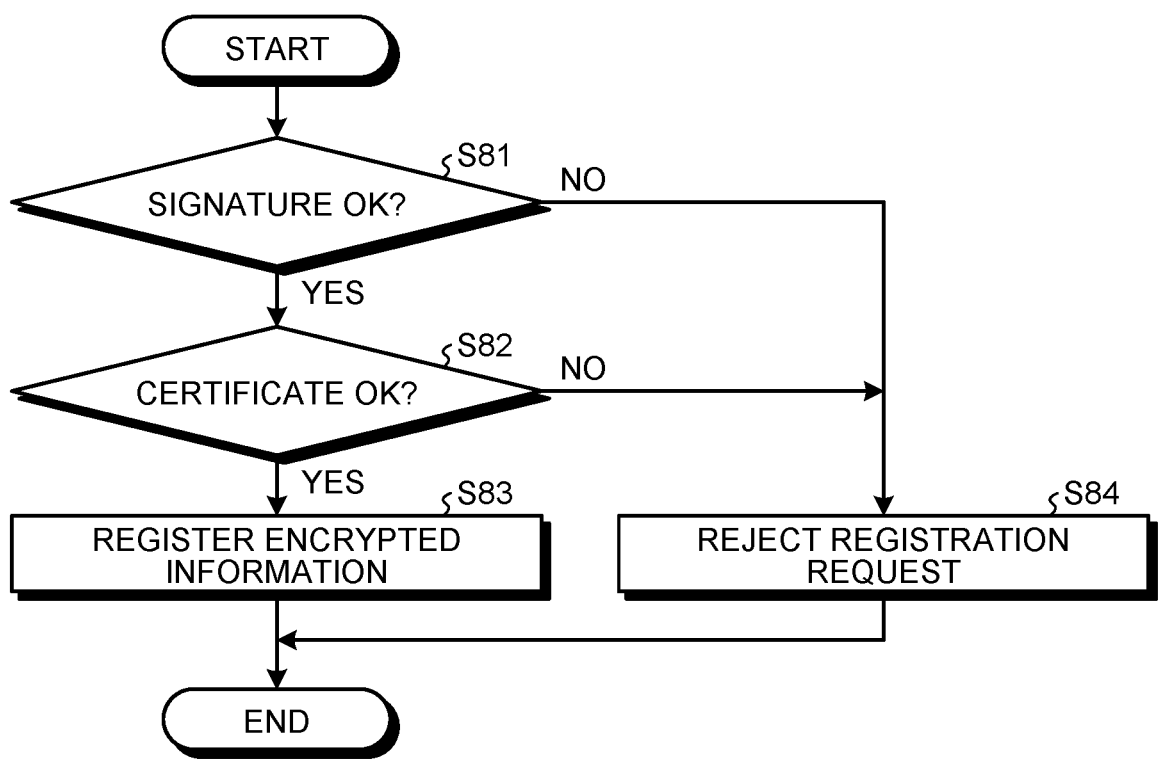
FIG. 13 is a flowchart illustrating an example of a procedure of a verification process of an operator according to the modification.

As illustrated in FIG. 12, in the block chain system 2, a plurality of pieces of encrypted information associated with the same user is managed in association with unique user identification information and the operator ID that has performed the identity verification process. Therefore, in the block chain system 2, it is necessary to prevent the operator ID from being forged. Hereinafter, an example of a method of verifying the operator ID will be described. FIG. 13 is a flowchart illustrating an example of a procedure of a process of verifying an operator according to a modification.

As illustrated in FIG. 13, upon receiving the identity verification registration request from the identity verification processing device 30, the block chain system 2 verifies the signature added to the identity verification registration request (Step S81). For example, the identity verification processing device 30 generates the signature using a signature key possessed by the device. The signature corresponds to, for example, a secret key included in the signature key. The block chain system 2 acquires the public key for signature verification of the identity verification processing device 30 from the trusted database, and attempts whether the signature can be decrypted.

When the signature verification is successful (Step S81; Yes), the block chain system 2 determines whether the signer matches the operator ID ([eKYC operator ID]) associated with the public key for signature verification in the trusted database (Step S82). That is, it is determined whether the combination of the signer of the identity verification registration request and the operator is correct.

When it is determined that the operator ID match the signer (Step S82; Yes), the block chain system 2 executes the registration of the encrypted information in response to the identity verification registration request (Step S83), and terminates the process illustrated in FIG. 13.

On the other hand, when it is determined that the operator IDs do not match the signer (Step S82; No), the block chain system 2 rejects the personal identity verification registration request (Step S84), and terminates the process illustrated in FIG. 13.

Furthermore, in Step S81 described above, in a case where the block chain system 2 has failed in verification of the signature (Step S81; No), the process proceeds to the processing procedure of Step S84. That is, the block chain system 2 rejects the identity verification registration request (Step S84), and terminates the process illustrated in FIG. 13.

In the procedure of the process illustrated in FIG. 13, an X.509 certificate may be used as a signature attached to the identity verification registration request. Then, whether the combination of the signer of the identity verification registration request and the operator is correct may be determined by determining whether the operator ID matches the owner ([Subject]) of the X.509 certificate.

<<<5. Others>>>

The process in the information processing system 1 according to the above-described embodiment can be used for various services requiring identity verification. For example, it can be used for identity verification at the time of entrance of a concert, an event, or the like, identity verification in various contracts, identity verification in various services such as a student discount, and the like. In addition, in conjunction with the process of various game applications, it can also be used as a generation condition of a user secret key generated only when identity verification is successful as a key for a process related to the progress of a game, for example, acquiring secret information that causes an event to occur, or reaching a secret place.

Further, it is also possible to manually perform all or part of the processes described as being performed automatically of respective processes described in the above embodiment, or alternatively, it is also possible to automatically perform all or part of the processes described as being performed manually by a known method. In addition, the processing procedure, specific name, and information including various pieces of data and parameters illustrated in the above document and drawings can be arbitrarily changed unless otherwise specified. For example, the various pieces of information illustrated in each figure are not limited to the illustrated information.

Further, each component of each of the illustrated devices is a functional concept, and does not necessarily have to be physically configured as illustrated in the figure. That is, the specific form of distribution/integration of each device is not limited to the one illustrated in the figure, and all or part of the device can be functionally or physically distributed/integrated in any unit according to various loads and usage conditions. For example, the identity verification processing device 30 and the settlement processing device 100 illustrated in FIG. 1 may be integrated. That is, the identity verification process and the settlement processing may be realized by one information processing device.

Further, the above-described embodiments and modifications can be appropriately combined in a range where the processing contents do not contradict each other.

Further, the effects in each embodiment described in the present specification are merely examples and are not limited, and other effects may be present.

<<<6. Effects>>>

As described above, the settlement processing device 100 according to the present disclosure is an information processing device that provides a service that requires the identity verification process at the time of use, and includes the acquisition unit 131, the verification unit 132, and the providing unit 133. The acquisition unit 131 acquires, from a user who is a request source for the service, proof information that is for proving, by zero knowledge proof, that the user is an identity verified user who has completed the identity verification process, and that is generated by using secret information that only the identity verified user is allowed to know. The secret information is, for example, a secret value (for example, a random number) associated with the user of the user terminal 10 who is a request source for the identity verification process. The verification unit 132 executes a verification process of the proof information acquired by the acquisition unit 131 by using the encrypted information encrypted by using the secret information and managed in the block chain system 2. The encrypted information is obtained by encrypting, with a random number, the identity verification information used in the identity verification process of the identity verified user. The providing unit 133 executes a process for providing a service to a user who is a request source for the service on condition that the user is proved to be an identity verified user as a result of the verification process by the verification unit 132. As described above, according to the embodiment of the present disclosure, the encrypted information obtained by encrypting the identity verification information can be managed as public information in the block chain system 2 and shared by service provider of a service that require identity verification at the time of use. Therefore, it is possible to simplify a procedure of identity verification of a service that requires identity verification when used. Furthermore, according to the embodiment of the present disclosure, instead of the identity verification information itself, encrypted information obtained by encrypting identity verification information is managed as public information in the block chain system 2. For this reason, it is possible to protect privacy of a service user of a service that requires identity verification at the time of use.

Furthermore, in the present disclosure, the secret information is a secret value (for example, a random number) associated with the user of the user terminal 10 who is a request source for the identity verification process. Accordingly, it is possible to set up information for proving the completion of the identity verification by the zero knowledge proof.

Furthermore, in the block chain system 2 according to the present disclosure, encrypted information is managed in association with user identification information uniquely allocated to each identity verified user. In the acquisition unit 131, the acquisition unit acquires the user identification information together with the proof information, and the verification unit acquires the encrypted information from the block chain system 2 using the user identification information acquired by the acquisition unit 131. As a result, it is possible to manage, for each user, information for proving the completion of the identity verification by the zero knowledge proof, and to easily acquire the information corresponding to the user as the service request source.

Furthermore, in the present disclosure, the acquisition unit 131 acquires, from the user terminal 10 used by the identity verified user, a user registration request for requesting user registration to the service. The providing unit 133 executes the user registration process of the identity verified user by using the session information returned to the identity verified user on condition that completion of the identity verification process is proved as a result of the verification processing by the verification unit 132. As a result, user registration for the identity verified user can be simplified.

Furthermore, in the present disclosure, the acquisition unit 131 acquires, from the user terminal 10 used by the identity verified user, an anonymous user registration request for anonymously requesting user registration to the service. The providing unit 133 executes the anonymous user registration process of the identity verified user by using the anonymous session information returned to the identity verified user on condition that completion of the identity verification process is proved as a result of the verification process by the verification unit 132. As a result, the anonymous user registration for the identity verified user can be simplified.

Furthermore, in the present disclosure, the acquisition unit 131 acquires, from the user terminal 10 used by the identity verified user, a remittance request in a cashless service provided as a service. The providing unit 133 executes a remittance process in response to the remittance request on condition that completion of the identity verification process is proved as a result of the verification process by the verification unit 132. As a result, it is possible to simplify the remittance for the identity verified user.

In addition, in the block chain system 2 according to the present disclosure, the credit score calculated in the identity verification process is managed in association with the user identification information. The acquisition unit 131 acquires, from the user terminal 10 used by the identity verified user, a loan examination request for receiving a loan service provided as a service. The providing unit 133 executes the loan examination process responding to the loan examination request using the credit score associated with the user identification information on condition that completion of the identity verification process is proved as a result of the verification processing by the verification unit 132. As a result, the loan examination for the identity verified user can be simplified.

Furthermore, in the present disclosure, the encrypted information is generated by each of the operators that perform the identity verification process by different methods. Furthermore, in the block chain system 2, the encrypted information associated with the same identity verified user is managed in association with the user identification information uniquely assigned to the identity verified user by each operator and the operator identification information unique to the operator. As a result, it is possible to manage the result of identity verification by a plurality of operators for the same user, and the settlement processing device 100 can execute verification related to the user as the service request source by using the result of identity verification by the operator required by the user.

Furthermore, in the present disclosure, the identity verification process performed by each operator is performed in a different way according to the authentication level required by the service. As a result, in the settlement processing device 100, the settlement processing device 100 can execute verification related to the user as the service request source by using the result of identity verification by the operator according to the authentication level required by the user.

Furthermore, in the present disclosure, in a case where encrypted information is registered in the block chain system 2 by each operator, a request for the registration is verified by signature information between each operator and the block chain system 2. As a result, it is possible to prevent falsification of the operator identification information and identity fraud for the operator.

The above-described effects are not necessarily limited, and may be at least one of the effects described in the present disclosure, or may be another effect.

<7. Hardware Configuration>

Figure 14:
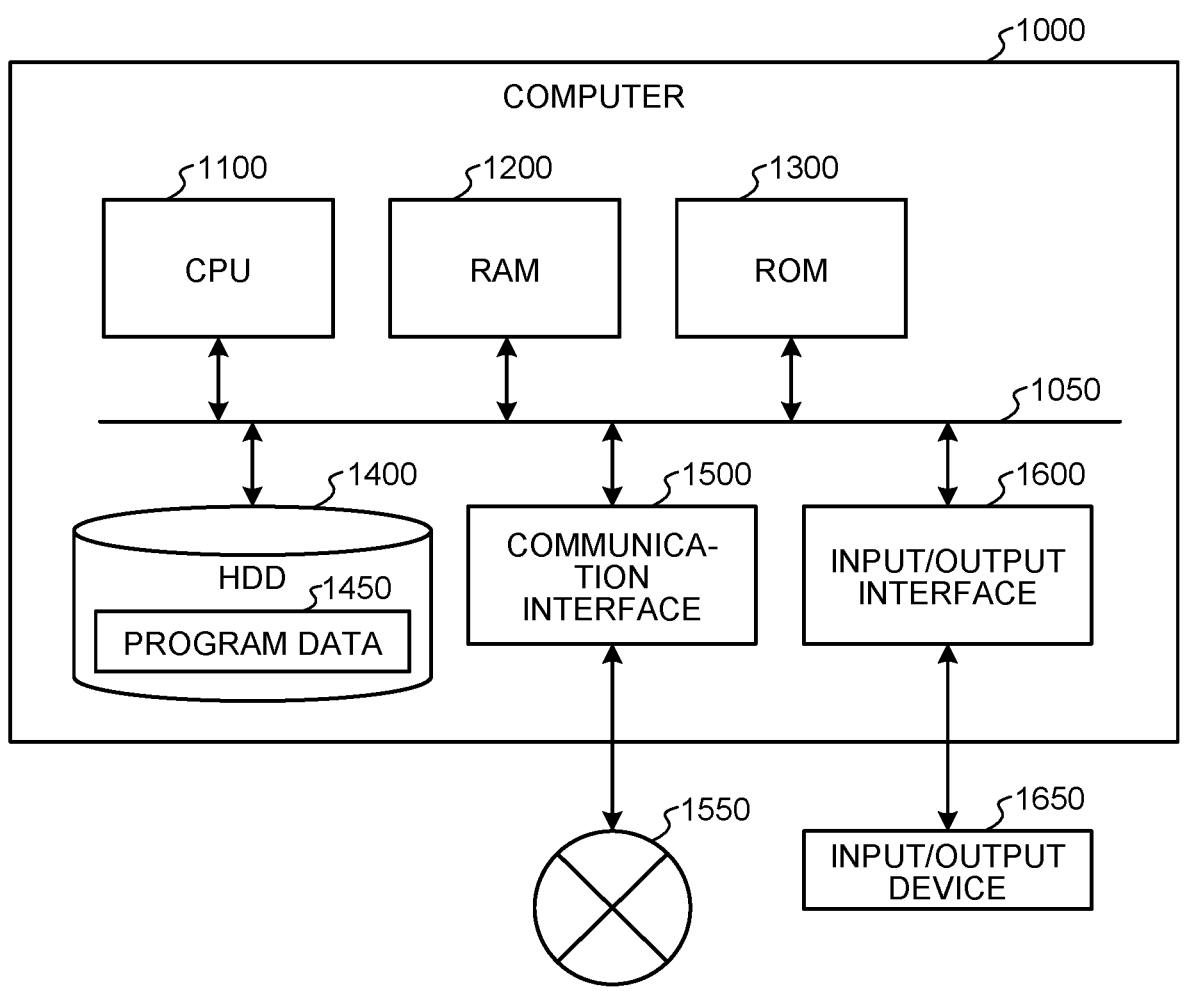
FIG. 14 is a hardware configuration diagram illustrating an example of a computer that implements functions of a settlement processing device.

The settlement processing device 100 according to each embodiment described above is implemented by, for example, a computer 1000 having a configuration as illustrated in FIG. 14. FIG. 14 is a hardware configuration diagram illustrating an example of a computer that implements the functions of the settlement processing device. The computer 1000 includes a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processes corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer 1000-readable recording medium that non-transiently records programs executed by the CPU 1100, data used by the programs, and the like. Specifically, the HDD 1400 is a recording medium that records a program for implementing the antenna switching process illustrated in FIG. 3, for example.

The communication interface 1500 is an interface for the computer 1000 to be connected to an external network 1550

(for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the settlement processing device 100 according to the embodiment, the CPU 1100 of the computer 1000 executes a program (such as a program for realizing the "ZKP-Verify" process) loaded on the RAM 1200. As a result, functions such as various types of processes executed by the control unit 130 of the settlement processing device 100 are realized. Furthermore, the HDD 1400 stores a program for realizing a process of the settlement processing device 100 according to the present disclosure, data stored in the storage unit 111, and the like. The CPU 1100 reads a program data 1450 from the HDD 1400 and executes the program data, but as another example, the program may be acquired from another device via the external network 1550.

The present technology may also be configured as below.

(1)

An information processing device that provides a service that requires an identity verification process, the information processing device comprising:

an acquisition unit that acquires, from a user terminal used by a user who is a request source for a service, proof information for proving, by zero knowledge proof, that the user is an identity verified user who has completed the identity verification process, the proof information being generated by using secret information that only the identity verified user is allowed to know;

a verification unit that executes a verification process of the proof information acquired by the acquisition unit using encrypted information of identity verification information used in an identity verification process of the identity verified user managed in a block chain system, the encrypted information being encrypted using the secret information; and a providing unit that executes a process for providing a service to the user who is a request source for the service on condition that the user is proved to be the identity verified user as a result of a verification process by the verification unit.

(2)

The information processing device according to (1), wherein the secret information includes a secret value associated with a user of a user terminal who is a request source for the identity verification process.

(3)

The information processing device according to (2), wherein in the block chain system, the encrypted information is managed in association with user identification information uniquely assigned to each of a plurality of the identity verified users, the acquisition unit acquires the proof information and the user identification information, and the verification unit acquires the encrypted information from the block chain system using the user identification information acquired by the acquisition unit.

(4)

The information processing device according to (3), wherein the acquisition unit acquires a user registration request for requesting user registration to the service from a user terminal used by the identity verified user, and the providing unit executes a user registration process in response to the user registration request using session information returned to the identity verified user on condition that completion of the identity verification process is proved as a result of a verification process by the verification unit.

(5)

The information processing device according to (3), wherein the acquisition unit acquires an anonymous user registration request for anonymously requesting anonymous user registration to the service from a user terminal used by the identity verified user, and the providing unit executes an anonymous user registration process in response to the anonymous user registration request using anonymous session information returned to the identity verified user on condition that completion of the identity verification process is proved as a result of a verification process by the verification unit.

(6)

The information processing device according to (3), wherein the acquisition unit acquires a remittance request in a cashless service provided as the service from a user terminal used by the identity verified user, and the providing unit executes a remittance process in response to the remittance request on condition that completion of the identity verification process is proved as a result of a verification process by the verification unit.

(7)

The information processing device according to (3), wherein in the block chain system, a credit score calculated in the identity verification process is managed in association with the user identification information, the acquisition unit acquires a loan examination request for receiving a loan service provided as the service from a user terminal used by the identity verified user, and the providing unit executes an examination process in response to the loan examination request using the credit score associated with the user identification information on condition that completion of the identity verification process is proved as a result of a verification process of the proof information in the verification unit.

(8)

The information processing device according to (3), wherein the encrypted information is generated by each of a plurality of operators that executes the identity verification process in different ways, and in the block chain system, the encrypted information associated with the same identity verified user is managed in association with the user identification information uniquely assigned to the identity verified user by the each operator and operator identification information unique to the operator.

(9)

The information processing device according to (8), wherein the identity verification process executed by the each operator is executed in a different way according to an authentication level required by a service.

(10)

The information processing device according to (9), wherein when the encrypted information is registered in a block chain system by the each operator, a request for the registration is verified by a signature information between the each operator and the block chain system.

(11)

An information processing method, by an information processing device that provides a service that requires an identity verification process using identity verification information, comprising:

acquiring, from a user terminal used by a user who is a request source for a service, proof information for proving, by zero knowledge proof, that the user is an identity verified user who has completed the identity verification process, the proof information being generated by using secret information that only the identity verified user is allowed to know;

executing a verification process of the proof information using encrypted information of identity verification information used in an identity verification process of the identity verified user managed in a block chain system, the encrypted information being encrypted using the secret information; and executing a process for providing a service to the user who is a request source for the service on condition that the user is proved to be the identity verified user as a result of the verification process.

REFERENCE SIGNS LIST

1 Information Processing System
2 Block Chain System
3 Communication Network
10 User Terminal
11 Communication Unit
12 Input Unit
13 Output Unit
14 Imaging Unit
15 Positioning Unit
16 Detection Unit
17 Storage Unit
17A Identity Verification Information Storage Unit
17B Secret Information Storage Unit
18 Control Unit
18A Identity Verification Request Unit
18B Service Request Unit
20 Node
30 Identity Verification Processing Device
31 Communication Unit
32 Storage Unit
33 Control Unit
33A Identity Verification Processing Unit
33B Registration Processing Unit
100 Settlement Processing Device
110 Communication Unit
120 Storage Unit
130 Control Unit
131 Acquisition Unit
132 Verification Unit
133 Providing Unit

The invention claimed is:

1. An information processing device that provides a service that requires an identity verification process, the information processing device comprising:

an acquisition unit that acquires, from a user terminal used by a user who is a request source for a service, proof information for proving, by zero knowledge proof, that the user is an identity verified user who has completed the identity verification process, the proof information being generated by using secret information that only the identity verified user is allowed to know;

a verification unit that executes a verification process of the proof information acquired by the acquisition unit using encrypted information of identity verification information used in an identity verification process of the identity verified user managed in a block chain system, the encrypted information being encrypted using the secret information; and a providing unit that executes a process for providing a service to the user who is a request source for the service on condition that the user is proved to be the identity verified user as a result of a verification process by the verification unit.

2. The information processing device according to claim 1, wherein the secret information includes a secret value associated with a user of a user terminal who is a request source for the identity verification process.

3. The information processing device according to claim 2, wherein in the block chain system, the encrypted information is managed in association with user identification information uniquely assigned to each of a plurality of the identity verified users, the acquisition unit acquires the proof information and the user identification information, and the verification unit acquires the encrypted information from the block chain system using the user identification information acquired by the acquisition unit.

4. The information processing device according to claim 3, wherein
the acquisition unit
acquires a user registration request for requesting user registration to the service from a user terminal used by the identity verified user, and
the providing unit
executes a user registration process in response to the user registration request using session information returned to the identity verified user on condition that completion of the identity verification process is proved as a result of a verification process by the verification unit.

5. The information processing device according to claim 3, wherein
the acquisition unit
acquires an anonymous user registration request for anonymously requesting anonymous user registration to the service from a user terminal used by the identity verified user, and
the providing unit
executes an anonymous user registration process in response to the anonymous user registration request using anonymous session information returned to the identity verified user on condition that completion of the identity verification process is proved as a result of a verification process by the verification unit.

6. The information processing device according to claim 3, wherein
the acquisition unit
acquires a remittance request in a cashless service provided as the service from a user terminal used by the identity verified user, and
the providing unit
executes a remittance process in response to the remittance request on condition that completion of the identity verification process is proved as a result of a verification process by the verification unit.

7. The information processing device according to claim 3, wherein
in the block chain system,
a credit score calculated in the identity verification process is managed in association with the user identification information,
the acquisition unit
acquires a loan examination request for receiving a loan service provided as the service from a user terminal used by the identity verified user, and
the providing unit
executes an examination process in response to the loan examination request using the credit score associated with the user identification information on condition that completion of the identity verification process is proved as a result of a verification process of the proof information in the verification unit.

8. The information processing device according to claim 3, wherein
the encrypted information
is generated by each of a plurality of operators that executes the identity verification process in different ways, and
in the block chain system,
the encrypted information associated with the same identity verified user is managed in association with the user identification information uniquely assigned to the identity verified user by the each operator and operator identification information unique to the operator.

9. The information processing device according to claim 8, wherein
the identity verification process executed by the each operator
is executed in a different way according to an authentication level required by a service.

10. The information processing device according to claim 9, wherein
when the encrypted information is registered in a block chain system by the each operator, a request for the registration is verified by a signature information between the each operator and the block chain system.

11. An information processing method, by an information processing device that provides a service that requires an identity verification process using identity verification information, comprising:
acquiring, from a user terminal used by a user who is a request source for a service, proof information for proving, by zero knowledge proof, that the user is an identity verified user who has completed the identity verification process, the proof information being generated by using secret information that only the identity verified user is allowed to know;
executing a verification process of the proof information using encrypted information of identity verification information used in an identity verification process of the identity verified user managed in a block chain system, the encrypted information being encrypted using the secret information; and
executing a process for providing a service to the user who is a request source for the service on condition that the user is proved to be the identity verified user as a result of the verification process.

* * * * *